US012713459B2

(12) United States Patent
Chu et al.

(10) Patent No.: US 12,713,459 B2
(45) Date of Patent: Aug. 18, 2026

(54) LOW LATENCY FRAME NOTIFICATION IN A WIRELESS NETWORK

(71) Applicant: NXP USA, Inc., Austin, TX (US)

(72) Inventors: Liwen Chu, San Ramon, CA (US); Kiseon Ryu, San Diego, CA (US); Hongyuan Zhang, San Jose, CA (US); Huizhao Wang, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 69 days.

(21) Appl. No.: 18/235,721

(22) Filed: Aug. 18, 2023

(65) Prior Publication Data

US 2024/0064800 A1 Feb. 22, 2024

Related U.S. Application Data

(60) Provisional application No. 63/476,163, filed on Dec. 19, 2022, provisional application No. 63/371,800, filed on Aug. 18, 2022.

(51) Int. Cl.
*H04W 84/12* (2009.01)
*H04L 5/00* (2006.01)
*H04W 74/0808* (2024.01)

(52) U.S. Cl.
CPC ....... *H04W 74/0808* (2013.01); *H04L 5/0092* (2013.01)

(58) Field of Classification Search
CPC ............. H04W 74/0808; H04W 84/12; H04W 74/002; H04L 5/0092
See application file for complete search history.

(56) References Cited

U.S. PATENT DOCUMENTS

2022/0150761 A1* 5/2022 Kim ...................... H04W 24/10
2022/0279601 A1* 9/2022 Xue .................. H04W 74/0816
2022/0400503 A1* 12/2022 Cavalcanti ........ H04W 72/1268
2022/0416971 A1* 12/2022 Noh ...................... H04L 5/0048
2023/0032578 A1* 2/2023 Kim ...................... H04W 28/02
2023/0284250 A1* 9/2023 Yu ....................... H04W 74/002 370/329
2023/0308943 A1* 9/2023 Ciochina-Kar ....... H04L 1/1887
2023/0379999 A1* 11/2023 Kim ..................... H04B 7/0413
2023/0389069 A1* 11/2023 Ciochina-Kar ....... H04L 5/0048
(Continued)

FOREIGN PATENT DOCUMENTS

EP 4191902 A1 * 6/2023 ............ H04W 24/08

OTHER PUBLICATIONS

Fang, Juan et al. "Preemption for Low Latency Application", IEEE 802.11-23/1229r0, (2022), 14 pgs.
(Continued)

*Primary Examiner* — Nicholas A Jensen
*Assistant Examiner* — Yonghong Zhao

(57) ABSTRACT

Embodiments of a method and apparatus for wireless communications are disclosed. In an embodiment, a wireless device includes a wireless transceiver configured to communicate within a transmit opportunity (TXOP), where the wireless transceiver is further configured to receive a low latency (LL) buffered frame indication from a first wireless device with an inter frame space that is equal to a Short Interframe Space (SIFS), and a controller configured to implement an inter frame space that is bigger than the SIFS between transmission of two consecutive frames through the wireless transceiver.

19 Claims, 16 Drawing Sheets

(56) References Cited

U.S. PATENT DOCUMENTS

| | | | | |
|---|---|---|---|---|
| 2024/0048304 | A1* | 2/2024 | Lanante | H04L 27/26025 |
| 2024/0340950 | A1* | 10/2024 | Hwang | H04W 74/00 |
| 2024/0349336 | A1* | 10/2024 | Yu | H04W 74/0808 |
| 2025/0056590 | A1* | 2/2025 | Verenzuela | H04W 72/512 |
| 2025/0193931 | A1* | 6/2025 | Fang | H04L 1/1854 |

OTHER PUBLICATIONS

Fang, Juan et al.; Preemption for Low Latency Application (follow-up); IEEE 802.11-23/1229r0; Aug. 10, 2023; 14 pgs.

Fang, Juan et al.; Preemption for Low Latency Application; IEEE 802.11-22/xxxxr0; 2022-xx-xx; 8 pgs.

* cited by examiner

FIG. 12
AP
1206
STA1
1210-1
STA2,3,4,5...
1210-2, ..., 1210-m
1212
RTS
SIFS
CTS
1214
SIFS
A-MPDUs WITH ACK POLICY
INDICATOR EQUAL TO BLOCK ACK
1216
TRIGGER TO SOLICIT
LL FRAMES
1218
SIFS
1224
EHT TB PPDU
WITH LL FRAMES

LOW LATENCY FRAME NOTIFICATION IN A WIRELESS NETWORK

CROSS-REFERENCE TO RELATED APPLICATIONS

This application is entitled to the benefit of U.S. Provisional Patent Application Ser. No. 63/371,800, filed on Aug. 18, 2022, and U.S. Provisional Patent Application Ser. No. 63/476,163, filed on Dec. 19, 2022, each of which is incorporated by reference herein.

BACKGROUND

Wireless communications devices, e.g., access points (APs) or non-AP devices can transmit various types of information using different transmission techniques. For example, various applications, such as, Internet of Things (IoT) applications can conduct wireless local area network (WLAN) communications, for example, based on Institute of Electrical and Electronics Engineers (IEEE) 802.11 family of standards (e.g., Wi-Fi standards). Some applications, for example, video surveillance or sharing applications, etc., require low latency (e.g., lower than 20 milliseconds) data transmission.

SUMMARY

Embodiments of a method and apparatus for wireless communications are disclosed. In an embodiment, a wireless device includes a wireless transceiver configured to communicate within a transmit opportunity (TXOP), where the wireless transceiver is further configured to receive a low latency (LL) buffered frame indication from a first wireless device with an inter frame space that is equal to a Short Interframe Space (SIFS), and a controller configured to implement an inter frame space that is bigger than the SIFS between transmission of two consecutive frames through the wireless transceiver. Other embodiments are also disclosed.

In an embodiment, the wireless transceiver is further configured to transmit the two consecutive frames within the TXOP.

In an embodiment, the wireless transceiver is further configured to receive the LL buffered frame indication from the first wireless device within the TXOP.

In an embodiment, the two consecutive frames are not low latency frames.

In an embodiment, the wireless transceiver is further configured to receive a low latency frame from the first wireless device.

In an embodiment, the wireless transceiver is further configured to receive a low latency frame from a wireless access point (AP).

In an embodiment, a maximal physical layer protocol data unit (PPDU) length in a Basic Service Set (BSS) is announced where stations in the BSS that support low latency preemption cannot transmit a PPDU that exceeds the announced maximal PPDU length.

In an embodiment, the wireless transceiver is further configured to announce a maximal PPDU length in a BSS where stations in the BSS that support low latency preemption cannot transmit a PPDU that exceeds the announced maximal PPDU length.

In an embodiment, a TXOP limit is announced, and stations cannot have a TXOP duration that is longer than the announced TXOP limit.

In an embodiment, the wireless transceiver is further configured to announce a TXOP limit, and stations cannot have a TXOP duration that is longer than the announced TXOP limit.

In an embodiment, a Clear to Send (CTS)-to-self with an address field being set to a Basic Service Set Identifier (BSSID) is used as the LL buffered frame indication.

In an embodiment, the same Modulation Coding Scheme (MCS), Number of Spatial Streams (Nss), or scrambling initial value that is used to produce the CTS-to-self is used to produce a physical layer protocol data unit (PPDU) that carries the LL buffered frame indication.

In an embodiment, the wireless transceiver is further configured to receive a plurality of LL buffered frame indications from stations, and where the stations are allocated to different groups such that each group is in a different resource unit (RU).

In an embodiment, the wireless device is compatible with an Institute of Electrical and Electronics Engineers (IEEE) 802.11 protocol.

In an embodiment, the wireless device is compatible with an Institute of Electrical and Electronics Engineers (IEEE) 802.11be protocol.

In an embodiment, the wireless device is a component of a multi-link device (MLD).

In an embodiment, the wireless device is a wireless access point (AP).

In an embodiment, a wireless device includes a wireless transceiver configured to communicate within a transmit opportunity (TXOP) and to receive a low latency (LL) buffered frame indication from a first wireless device with an inter frame space that is equal to a Short Interframe Space (SIFS) and a controller configured to implement an inter frame space that is bigger than the SIFS between transmission of two consecutive frames through the wireless transceiver, where the wireless device is compatible with an Institute of Electrical and Electronics Engineers (IEEE) 802.11 protocol, where the wireless transceiver is further configured to transmit the two consecutive frames within the TXOP and to receive the LL buffered frame indication from the first wireless device within the TXOP.

In an embodiment, a method for wireless communications involves communicating within a transmit opportunity (TXOP), including receiving a low latency (LL) buffered frame indication from a first wireless device with an inter frame space that is equal to a Short Interframe Space (SIFS) and implementing an inter frame space that is bigger than the SIFS between transmission of two consecutive frames, wherein fair low latency preemption is guaranteed.

In an embodiment, communicating within the TXOP includes transmitting the two consecutive frames within the TXOP.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
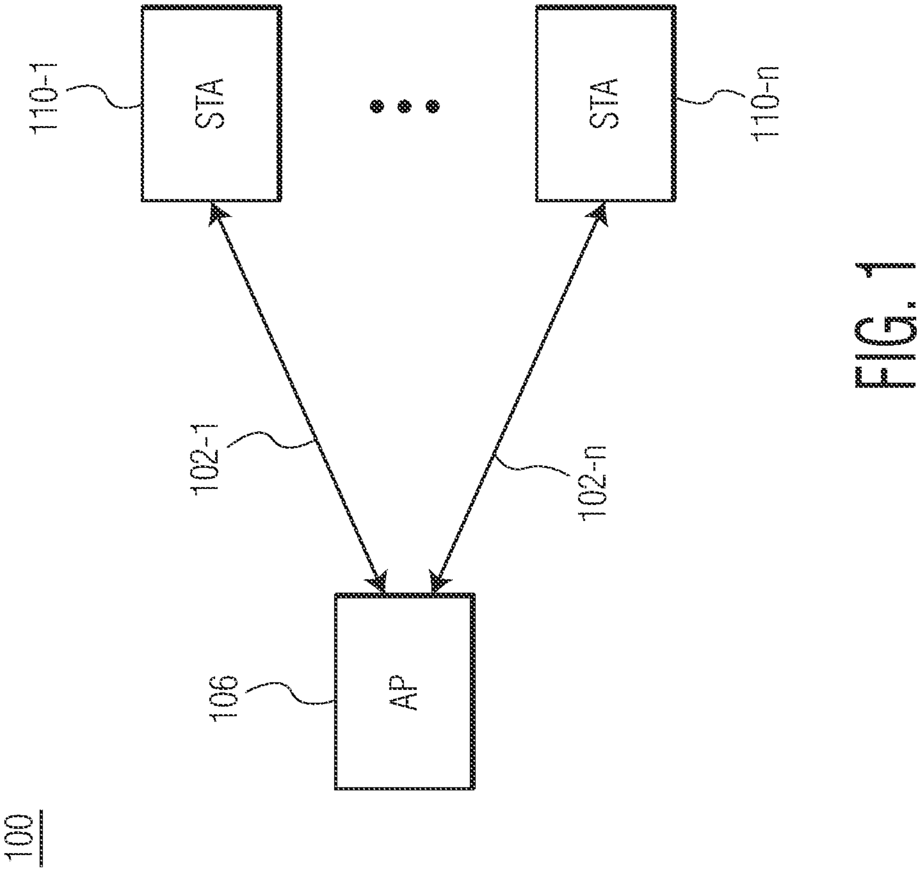
FIG. 1 depicts a wireless communications system in accordance with an embodiment of the invention.

FIG. 1 depicts a wireless (e.g., WiFi) communications system 100 in accordance with an embodiment of the invention. In the embodiment depicted in FIG. 1, the wireless communications system 100 includes at least one AP 106 and at least one station (STA) 110-1, . . . , **110-*n*, where n is a positive integer. The wireless communications system can be used in various applications, such as industrial applications, medical applications, computer applications, and/or consumer or enterprise applications. In some embodiments, the wireless communications system is compatible with an IEEE 802.11 protocol. Although the depicted wireless communications system 100 is shown in FIG. 1 with certain components and described with certain functionality herein, other embodiments of the wireless communications system may include fewer or more components to implement the same, less, or more functionality. For example, in some embodiments, the wireless communications system includes multiple APs with one STA, multiple APs with multiple STAs, one AP with one STA, or one AP with multiple STAs. In another example, although the wireless communications system is shown in FIG. 1 as being connected in a certain topology, the network topology of the wireless communications system is not limited to the topology shown in FIG. 1. In some embodiments, the wireless communications system 100 described with reference to FIG. 1 involves single-link communications and the AP and the STA communicate through single communications links. In some embodiments, the wireless communications system 100 described with reference to FIG. 1** involves multi-link communications and the AP and the STA communicate through multiple communications links. Furthermore, the techniques described herein may also be applicable to each link of a multi-link communications system.

In the embodiment depicted in FIG. 1, the AP 106 may be implemented in hardware (e.g., circuits), software, firmware, or a combination thereof. The AP 106 may be fully or partially implemented as an integrated circuit (IC) device. In some embodiments, the AP 106 is a wireless AP compatible with at least one WLAN communications protocol (e.g., at least one IEEE 802.11 protocol). In some embodiments, the AP is a wireless AP that connects to a local area network (LAN) and/or to a backbone network (e.g., the Internet) through a wired connection and that wirelessly connects to one or more wireless stations (STAs), for example, through one or more WLAN communications protocols, such as the IEEE 802.11 protocol. In some embodiments, the AP includes at least one antenna, at least one transceiver operably connected to the at least one antenna, and at least one controller operably connected to the corresponding transceiver. In some embodiments, the transceiver includes a physical layer (PHY) device. The controller may be configured to control the transceiver to process received packets through the antenna. In some embodiments, the controller is implemented within a processor, such as a microcontroller, a host processor, a host, a digital signal processor (DSP), or a central processing unit (CPU), which can be integrated in a corresponding transceiver. In some embodiments, the AP 106 (e.g., a controller or a transceiver of the AP) implements upper layer Media Access Control (MAC) functionalities (e.g., beacon acknowledgement establishment, reordering of frames, etc.) and/or lower layer MAC functionalities (e.g., backoff, frame transmission, frame reception, etc.). Although the wireless communications system 100 is shown in FIG. 1 as including one AP, other embodiments of the wireless communications system 100 may include multiple APs. In these embodiments, each of the APs of the wireless communications system 100 may operate in a different frequency band. For example, one AP may operate in a 2.4 gigahertz (GHz) frequency band and another AP may operate in a 5 GHz frequency band.

In the embodiment depicted in FIG. 1, each of the at least one STA 110-1, . . . , **110-*n* may be implemented in hardware (e.g., circuits), software, firmware, or a combination thereof. The STA 110-1, . . . , or 110-*n* may be fully or partially implemented as IC devices. In some embodiments, the STA 110-1, . . . , or 110-*n* is a communications device compatible with at least one IEEE 802.11 protocol. In some embodiments, the STA 110-1, . . . , or 110-*n* is implemented in a laptop, a desktop personal computer (PC), a mobile phone, or other communications device that supports at least one WLAN communications protocol. In some embodiments, the STA 110-1, . . . , or 110-*n* implements a common MAC data service interface and a lower layer MAC data service interface. In some embodiments, the STA 110-1, . . . , or 110-*n*** includes at least one antenna, at least one transceiver operably connected to the at least one antenna, and at least one controller connected to the corresponding transceiver. In some embodiments, the transceiver includes a PHY device. The controller may be configured to control the transceiver to process received packets through the antenna. In some embodiments, the controller is implemented within a processor, such as a microcontroller, a host processor, a host, a DSP, or a CPU, which can be integrated in a corresponding transceiver.

In the embodiment depicted in FIG. 1, the AP 106 communicates with the at least one STA 110-1, . . . , **110-*n* via a communication link 102-1, . . . , 102-*n*, where n is a positive integer. In some embodiments, data communicated between the AP and the at least one STA 110-1, . . . , 110-*n*** includes MAC protocol data units (MPDUs). An MPDU may include a frame header, a frame body, and a trailer with the MPDU payload encapsulated in the frame body.

In embodiments of a wireless communications system, a wireless device, e.g., an access point (AP) multi-link device (MLD) of a wireless local area network (WLAN) may transmit data to at least one associated station (STA) MLD. The AP MLD may be configured to operate with associated STA MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol that is compatible with IEEE 802.11ax standards, Very High Throughput (VHT) communication protocol that is compatible with IEEE 802.11ac standards, etc.) may be collectively referred to herein as "legacy" communication protocols.

Figure 2:
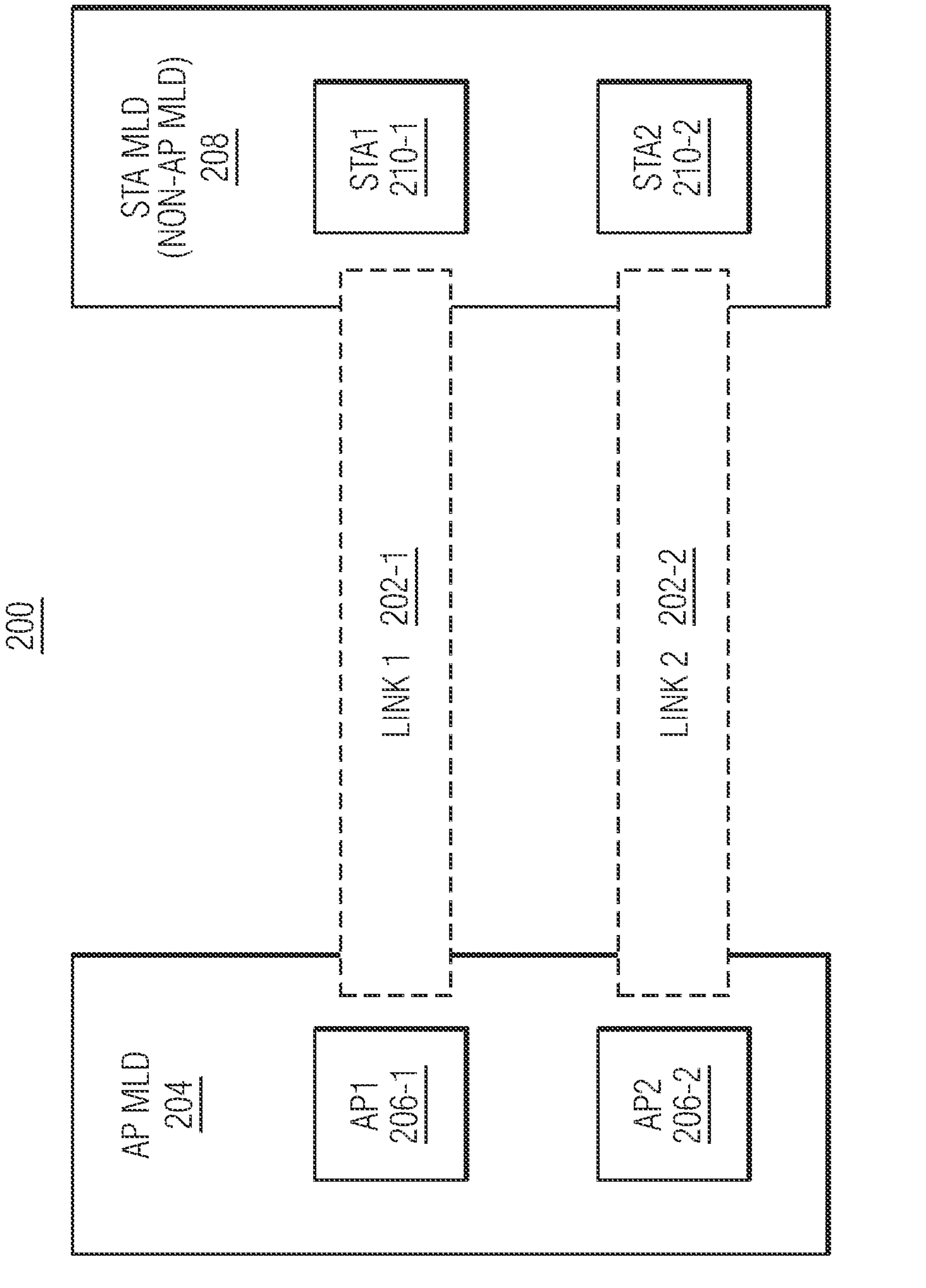
FIG. 2 depicts a multi-link communications system in accordance with an embodiment of the invention.

FIG. 2 depicts a multi-link communications system 200 in accordance with an embodiment of the invention. In the embodiment depicted in FIG. 2, the multi-link communications system includes one AP multi-link device, which is implemented as AP MLD 204, and one non-AP STA multi-link device, which is implemented as STA MLD 208. The multi-link communications system is an embodiment of the wireless communications system 100 depicted in FIG. 1. In some embodiments, the multi-link communications system is a wireless communications system compatible with an IEEE 802.11 protocol. For example, the multi-link communications system may be a wireless communications system compatible with an IEEE 802.11be protocol. Although the depicted multi-link communications system 200 is shown in FIG. 2 with certain components and described with certain functionality herein, other embodiments of the multi-link communications system may include fewer or more components to implement the same, less, or more functionality. For example, in some embodiments, the multi-link communications system includes a single AP MLD with multiple STA MLDs, or multiple AP MLDs with more than one STA MLD. In some embodiments, the legacy STAs (non-HE STAs) associate with one of the APs affiliated with the AP MLD. In another example, although the multi-link communications system is shown in FIG. 2 as being connected in a certain topology, the network topology of the multi-link communications system is not limited to the topology shown in FIG. 2.

In the embodiment depicted in FIG. 2, the AP MLD 204 includes two radios, implemented as APs 206-1 and 206-2. In such an embodiment, the APs may be AP1 206-1 and AP2 206-2. In some embodiments, a common part of the AP MLD 204 implements upper layer Media Access Control (MAC) functionalities (e.g., beaconing, association establishment, reordering of frames, etc.) and a link specific part of the AP MLD 204, i.e., the APs 206-1 and 206-2, implement lower layer MAC functionalities (e.g., backoff, frame transmission, frame reception, etc.). The APs 206-1 and 206-2 may be implemented in hardware (e.g., circuits), software, firmware, or a combination thereof. The APs 206-1 and 106-2 may be fully or partially implemented as an integrated circuit (IC) device. In some embodiments, the APs 206-1 and 206-2 may be wireless APs compatible with at least one WLAN communications protocol (e.g., at least one IEEE 802.11 protocol). For example, the APs 206-1 and 206-2 may be wireless APs compatible with the IEEE 802.11be protocol.

In some embodiments, an AP MLD (e.g., AP MLD 204) connects to a local network (e.g., a LAN) and/or to a backbone network (e.g., the Internet) through a wired connection and wirelessly connects to wireless STAs, for example, through one or more WLAN communications protocols, such as an IEEE 802.11 protocol. In some embodiments, an AP (e.g., AP1 206-1 and/or AP2 206-2) includes at least one antenna, at least one transceiver operably connected to the at least one antenna, and at least one controller operably connected to the corresponding transceiver. In some embodiments, at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 206-1 or 206-2 of the AP MLD 204 may operate in a different BSS operating channel. For example, AP1 206-1 may operate in a 320 MHz (one million hertz) BSS operating channel at 6 Gigahertz (GHz) band and AP2 106-2 may operate in a 160 MHz BSS operating channel at 5 GHz band. Although the AP MLD 204 is shown in FIG. 2 as including two APs, other embodiments of the AP MLD 204 may include more than two APs.

In the embodiment depicted in FIG. 2, the non-AP STA multi-link device, implemented as STA MLD 208, includes two radios which are implemented as non-AP STAs 210-1 and 210-2. In such an embodiment, the non-AP STAs may be STA1 210-1 and STA2 210-2. The STAs 210-1 and 210-2 may be implemented in hardware (e.g., circuits), software, firmware, or a combination thereof. The STAs 210-1 and 210-2 may be fully or partially implemented as an IC device. In some embodiments, the non-AP STAs 210-1 and 210-2 are part of the STA MLD 208, such that the STA MLD may be a communications device that wirelessly connects to a wireless AP MLD. For example, the STA MLD 208 may be implemented in a laptop, a desktop personal computer (PC), a mobile phone, or other communications device that supports at least one WLAN communications protocol. In some embodiments, the non-AP STA MLD 208 is a communications device compatible with at least one IEEE 802.11 protocol (e.g., an IEEE 802.11be protocol, an IEEE 802.11ax protocol, or an IEEE 802.11ac protocol). In some embodiments, the STA MLD 208 implements a common MAC data service interface and the non-AP STAs 210-1 and 210-2 implement a lower layer MAC data service interface.

In some embodiments, the AP MLD 204 and/or the STA MLD 208 may identify which communication links support multi-link operation during a multi-link operation setup phase and/or exchanges information regarding multi-link capabilities during the multi-link operation setup phase. In some embodiments, each of the non-AP STAs 210-1 and 210-2 of the STA MLD 208 may operate in a different frequency band. For example, the non-AP STA 210-1 may operate in the 2.4 GHz frequency band and the non-AP STA 210-2 may operate in the 5 GHz frequency band. In some embodiments, each STA includes at least one antenna, at least one transceiver operably connected to the at least one antenna, and at least one controller connected to the corresponding transceiver. In some embodiments, at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 2, the STA MLD 208 communicates with the AP MLD 204 via two communication links, e.g., link 1 202-1 and link 2 202-2. For example, each of the non-AP STAs 210-1 or 210-2 communicates with an AP 206-1 or 206-2 via corresponding communication links 202-1 or 202-2. In an embodiment, a communication link (e.g., link 1 202-1 or link 2 202-2) may include a BSS operating channel established by an AP (e.g., AP1 206-1 or AP2 206-2) that features multiple 20 MHz channels used to transmit frames (e.g., Physical Layer Convergence Protocol (PLCP) Protocol Data Units (PPDUs), Beacon frames, management frames, etc.) between a first wireless device (e.g., an AP, an AP MLD, an STA, or an STA MLD) and a second wireless device (e.g., an AP, an AP MLD, an STA, or an STA MLD). In some embodiments, a 20 MHz channel may be a punctured 20 MHz channel or an unpunctured 20 MHz channel. Although the STA MLD 208 is shown in FIG. 2 as including two non-AP STAs, other embodiments of the STA MLD 208 may include one non-AP STA or more than two non-AP STAs. In addition, although the AP MLD 204 communicates (e.g., wirelessly communicates) with the STA MLD 208 via multiple links 202-1 and 202-2, in other embodiments, the AP MLD 204 may communicate (e.g., wirelessly communicate) with the STA MLD 208 via more than two communication links or less than two communication links.

Long PPDU length can cause issues for low latency traffic. For example, when a TXOP initiator transmits a long PPDU, a corresponding TXOP responder or a third-party STA cannot preempt the TXOP until the end of the PPDU. The TXOP initiator may need to truncate the long PPDU in order to transmit its low latency traffic, which can make the implementation complicated. In some embodiments, an AP announces the maximal PPDU length through a beacon (Probe Response, Association Response, etc.) that a STA can use. In some embodiments, a STA in a BSS in which the AP reside cannot transmit a PPDU that is longer than the announced PPDU length. In some embodiments, if a STA in a BSS in which the AP resides supports low latency preemption, the STA cannot transmit a PPDU that is longer than the announced PPDU length. The restricted PPDU length can be applied to the PPDU of non-low latency traffic only or any PPDU. In some embodiments, an AP can announce the TXOP limit. If a STA in a BSS in which the AP resides does not support low latency preemption, the STA's PPDU length can be restricted through the AP's announced TXOP limit.

To accommodate low latency traffic, several issues need to be addressed. For example, a long TXOP for STAs that do not support low latency preemption may increase the latency of low latency traffic. In addition, collision avoidance needs to be implemented when multiple third party STAs have low latency frames that wait for the transmission. Further, whether a STA has buffered low latency frames may need to be acquired without using uplink orthogonal frequency-division multiple access (OFDMA)-based random access (UORA), Neighbor Discovery Protocol (NDP) feedback report. Additionally, a Trigger-based (TB) PPDU may not be transmitted when a solicited STA solicited by Trigger frame for low latency (LL) frame transmission has no buffered LL frames.

In some embodiments, a restricted TXOP limit is implemented. In an embodiment, a STA requests the TXOP limit per its low latency traffic requirement. In this embodiment, the AP announces the TXOP limit per the request from the associated STA and/or the requirement of itself, e.g., by adding the TXOP restriction to the STAs that do not support low latency preemption.

In some embodiments, low latency (LL) buffered frame indication without polling is implemented. In an embodiment, a Transmit opportunity (TXOP) holder transmits a PPDU with an inter-frame space longer than Short Inter-frame Space (SIFS) while third party STAs transmit the LL buffered frame indication with SIFS inter-frame space. In some embodiments, SIFS is the amount of time in microseconds required for a wireless interface to process a received frame and to respond with a response frame, which is the difference in time between the first symbol of the response frame in the air and the last symbol of the received frame in the air. In some embodiments, a wireless transmitter sends a burst of frames during a transmit opportunity (TXOP) and a short interframe space (SIFS) is used between consecutive frames. Multiple third party STAs may transmit LL buffered frame indication, and a corresponding AP may transmit LL frames. The collision for such multiple transmission needs to be addressed.

Figure 3:
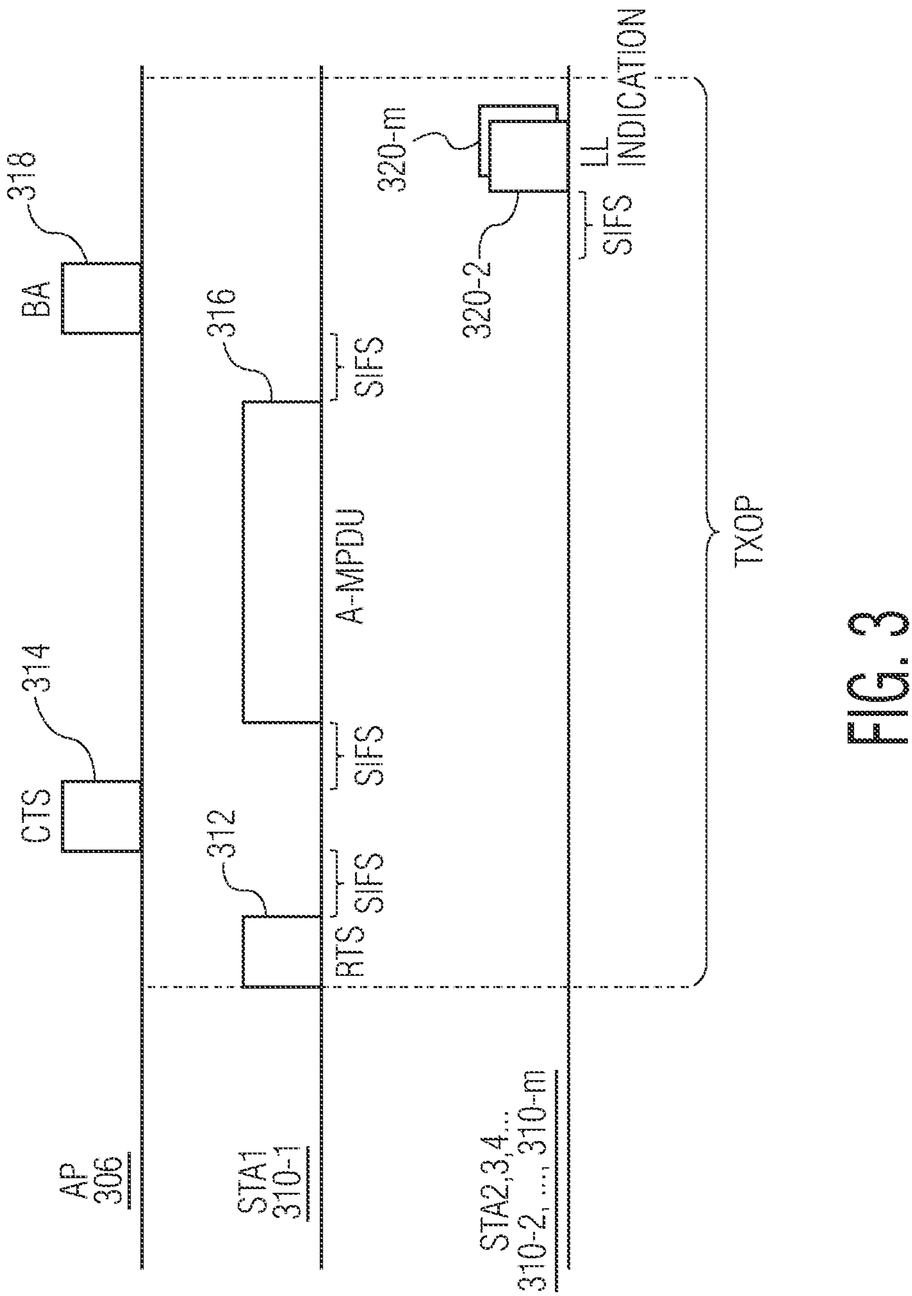
FIG. 3 depicts a frame exchange sequence diagram between an AP, a station (STA) with a TXOP, and other STAs.

FIG. 3 depicts a frame exchange sequence diagram between an AP 306, a STA 310-1 with a TXOP, and other STAs 310-2, . . . , 310-*m*, where m is a positive integer that is greater than one. In the embodiment depicted in FIG. 3, the AP 306 may be implemented the same as or similar to the AP 106 depicted in FIG. 1, while the STAs 310-1, . . . , 310-*m* may be implemented the same as or similar to the STA 110-2, . . . , 110-*n* depicted in FIG. 1. In the frame exchange sequence diagram depicted in FIG. 3, a Request to Send (RTS) 312 is sent by the STA 310-1 to reserve the TXOP. After an SIFS, a Clear to Send (CTS) 314 is sent by the AP 306. After an SIFS, an Aggregate MAC Protocol Data Unit (A-MPDU) 316 is sent by the STA 310-1. After an SIFS, a block acknowledgement (BA) frame 318 is sent by the AP 306. After an SIFS, low latency (LL) buffered frame indications 320-2, . . . , 320-*m* are sent by the STAs 310-2, . . . , 310-*m*. In order for the TXOP holder and the AP to figure out that the received PPDU carries the valid indication, the PPDU transmitted by the multiple third party STAs need to be the same.

Figure 4:
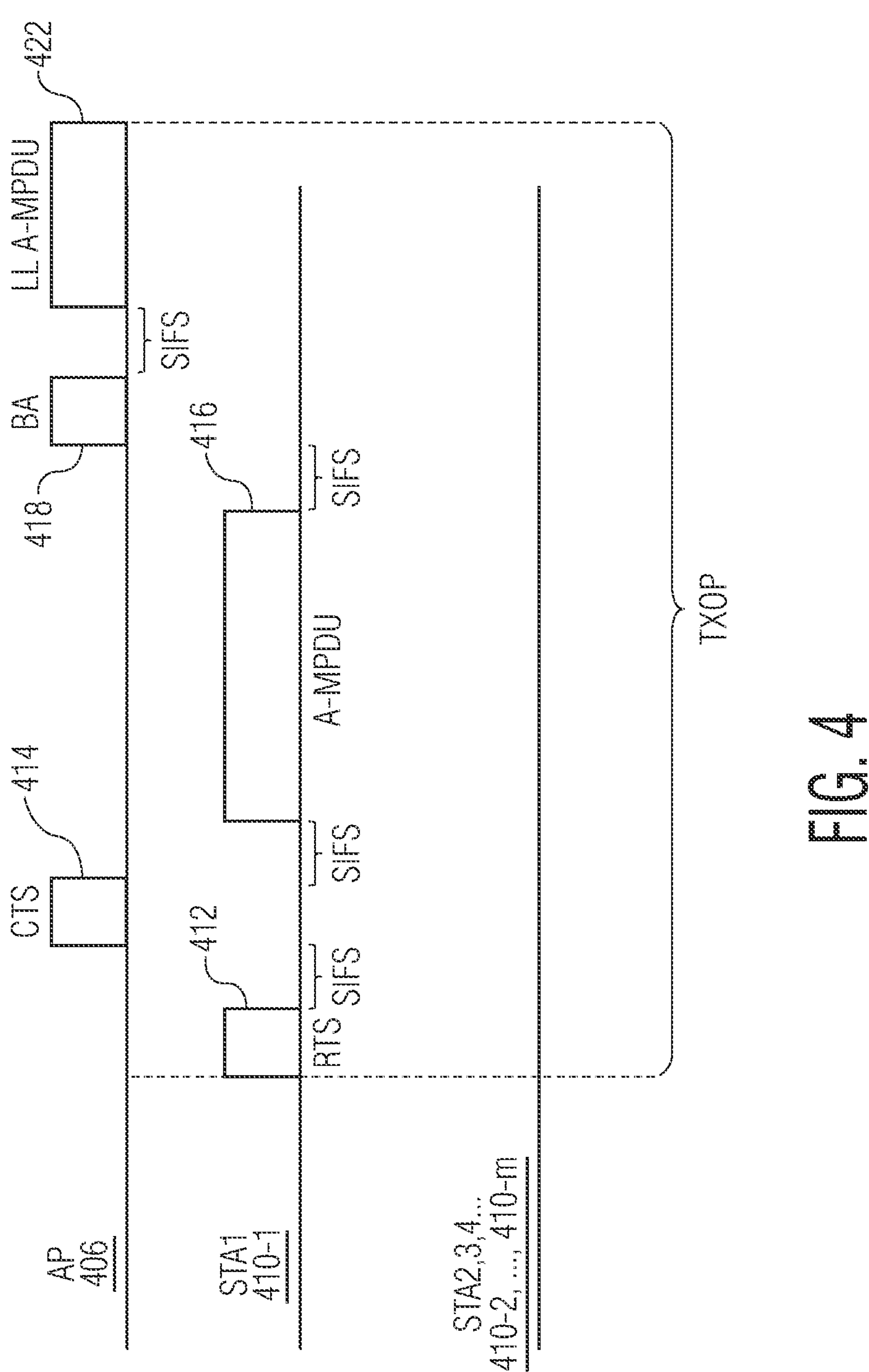
FIG. 4 depicts a frame exchange sequence diagram between an AP, a STA with a TXOP, and other STAs.

FIG. 4 depicts a frame exchange sequence diagram between an AP 406, a STA 410-1 with a TXOP, and other STAs 410-2, . . . , 410-*m*, where m is a positive integer that is greater than one. In the embodiment depicted in FIG. 4, the AP 406 may be implemented the same as or similar to the AP 106 depicted in FIG. 1, while the STAs 410-1, . . . , 410-*m* may be implemented the same as or similar to the STA 110-2, . . . , 110-*n* depicted in FIG. 1. In the frame exchange sequence diagram depicted in FIG. 4, an RTS 412 is sent by the STA 410-1 to reserve the TXOP. After an SIFS, a CTS 414 is sent by the AP 406. After an SIFS, an A-MPDU 416 is sent by the STA 410-1. After an SIFS, a BA frame 418 is sent by the AP 406. After an SIFS, a low latency (LL) A-MPDU 422 is sent by the AP 406. The method to avoid a third-party STA to transmit the buffered frame indication while the AP transmits LL frame at the same time should be provided.

Figure 5:
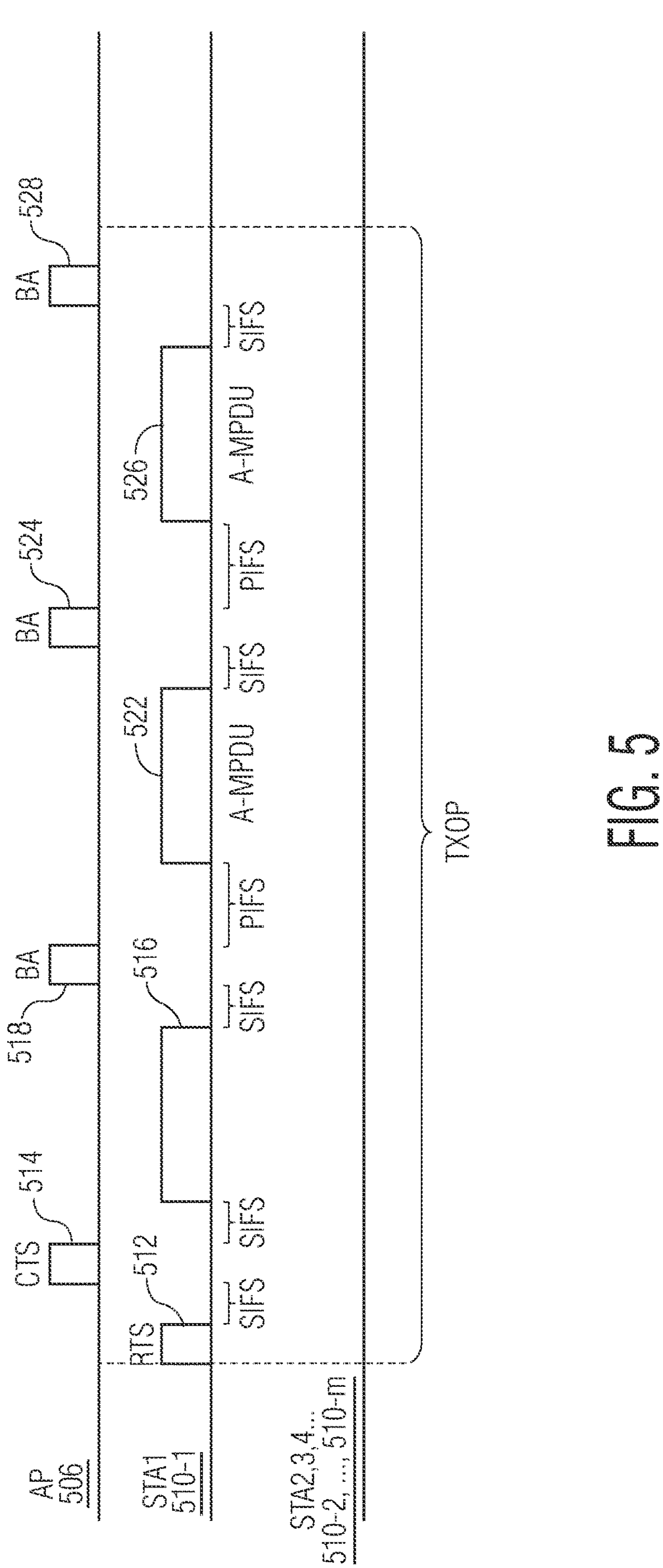
FIG. 5 depicts a frame exchange sequence diagram between an AP, a STA with a TXOP, and other STAs.

FIG. 5 depicts a frame exchange sequence diagram between an AP 506, a STA 510-1 with a TXOP, and other STAs 510-2, . . . , 510-*m*, where m is a positive integer that is greater than one. In the embodiment depicted in FIG. 5, the AP 506 may be implemented the same as or similar to the AP 106 depicted in FIG. 1, while the STAs 510-1, . . . , 510-*m* may be implemented the same as or similar to the STA 110-2, . . . , 110-*n* depicted in FIG. 1. In the frame exchange sequence diagram depicted in FIG. 5, a RTS 512 is sent by the STA 510-1 to reserve the TXOP. After an SIFS, a CTS 514 is sent by the AP 506. After an SIFS, an A-MPDU 516 is sent by the STA 510-1. After an SIFS, a BA frame 518 is sent by the AP 506. After a point coordination function (PCF) Interframe Space (PIFS) that is longer than an SIFS, a subsequent A-MPDU 522 is sent by the STA 510-1. After an SIFS, a subsequent BA frame 524 is sent by the AP 506. After a PIFS, a subsequent A-MPDU 526 is sent by the STA 510-1. After an SIFS, a subsequent BA frame 528 is sent by the AP 506.

Figure 6:
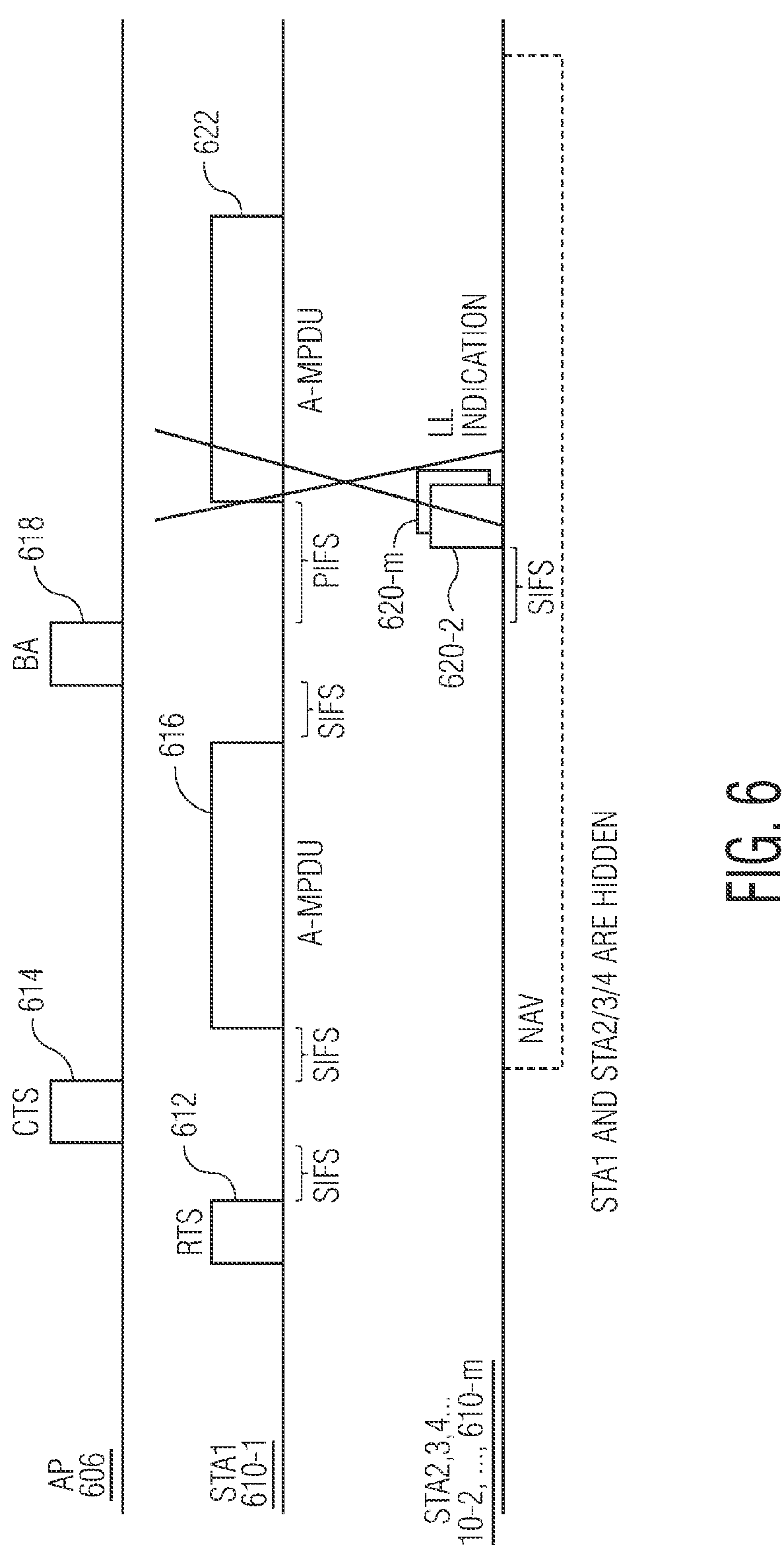
FIG. 6 depicts a frame exchange sequence diagram between an AP, a STA with a TXOP, and other STAs.
Figure 7:
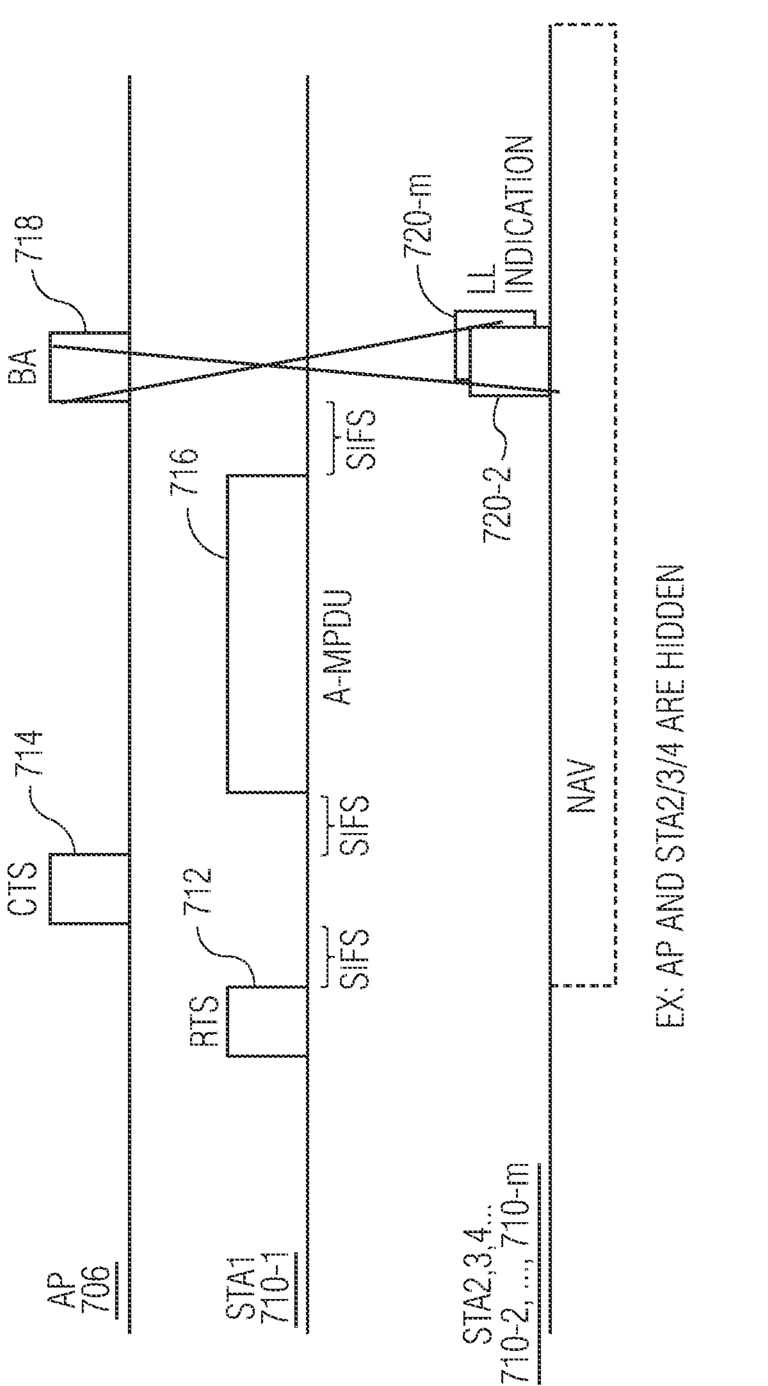
FIG. 7 depicts a frame exchange sequence diagram between an AP, a STA with a TXOP, and other STAs.

If a third party STA that transmits an LL indication frame and the TXOP holder/TXOP responder are hidden nodes from each other, the LL indication frame and an A-MPDU/BA frame may collide. FIG. 6 depicts a frame exchange sequence diagram between an AP 606, a STA 610-1 with a TXOP, and other STAs 610-2, . . . , 610-*m*, where m is a positive integer that is greater than one. In the embodiment depicted in FIG. 6, the AP 606 may be implemented the same as or similar to the AP 106 depicted in FIG. 1, while the STAs 610-1, . . . , 610-*m* may be implemented the same as or similar to the STA 110-2, . . . , 110-*n* depicted in FIG. 1. In the frame exchange sequence diagram depicted in FIG. 6, a RTS 612 is sent by the STA 610-1 to reserve the TXOP. After an SIFS, a CTS 614 is sent by the AP 606. After an SIFS, an A-MPDU 616 is sent by the STA 610-1. After an SIFS, a BA frame 618 is sent by the AP 606. After a PIFS, a subsequent A-MPDU 622 is sent by the STA 510-1. However, because the STA 610-1 is hidden from the STAs 610-2, . . . , 610-*m*, after an SIFS, low latency (LL) buffered frame indications 620-2, . . . , 620-*m* are sent by the STAs 610-2, . . . , 610-*m*. Consequently, the A-MPDU 622 collides with the LL buffered frame indications 620-2, . . . , 620-*m*. FIG. 7 depicts a frame exchange sequence diagram between an AP 706, a STA 710-1 with a TXOP, and other STAs 710-2, . . . , 710-*m*, where m is a positive integer that is greater than one. In the embodiment depicted in FIG. 7, the AP 706 may be implemented the same as or similar to the AP 106 depicted in FIG. 1, while the STAs 710-1, . . . , 710-*m* may be implemented the same as or similar to the STA 110-2, . . . , 110-*n* depicted in FIG. 1. In the frame exchange sequence diagram depicted in FIG. 7, an RTS 712 is sent by the STA 710-1 to reserve the TXOP. After an SIFS, a CTS 714 is sent by the AP 706. After an SIFS, an A-MPDU 716 is sent by the STA 710-1. After an SIFS, a BA frame 718 is sent by the AP 706. However, because the AP 706 is hidden from the STAs 610-2, . . . , 610-*m*, after an SIFS, low latency (LL) buffered frame indications 720-2, . . . , 720-*m* are sent by the STAs 710-2, . . . , 710-*m*. Consequently, the BA frame 718 collides with the LL buffered frame indications 720-2, . . . , 720-*m*.

In some embodiments, to avoid frame collisions, a PHY header of a PPDU may include an indication 1 of whether transmission of an LL indication frame is allowed after the PPDU. In some embodiments, the indication 1 in a PPDU indicates whether a third-party STA or a TXOP responder can do the LL preemption SIFS after the PPDU. In these embodiments, the indication 2 in a PPDU1 (e.g., a soliciting PPDU) transmitted by the TXOP holder indicates whether the TXOP responder sets the indication 1 to TRUE in the responding PPDU (PPDU2). In a frame sequence example, A-MPDU in PPDU1 with indication 1 equal to FALSE and indication 2 equal to TRUE, SIFS, BA in PPDU2 with indication 1 equal to TRUE and indication 2 equal to FALSE. A third-party STA can transmit its LL indication SIFS after PPDU2. Without the indication 2, the TXOP responder cannot indicate the allowance of LL preemption, because whether the preemption is allowed after a TXOP is decided by the TXOP holder (i.e., the transmitter of an RTS). If indication 1 in the soliciting PPDU that solicits BA is set to TRUE, both BA and the LL indication will be transmitted SIFS after the soliciting PPDU. In some embodiments, to avoid frame collisions, a PHY header of a PPDU1 that carries the soliciting frame(s) may include an indication 2 of whether the PHY header of the PPDU2 carrying the responding frame includes an indication 1 of whether transmission of an LL indication frame is allowed after the PPDU2. For example, for collision avoidance, a third party STA may send an LL indication frame when the following condition is met: the third party STA receives a PPDU indicating that transmission of an LL indication frame is allowed after the PPDU (e.g., a PHY header with the indication 1 set to TRUE). For example, if the acknowledgement policy indicator of the A-MPDU in the PPDU indicates "Block Ack", the PPDU does not solicit an immediate acknowledgement frame from the recipient of the PPDU. The PHY header of the PPDU can include the indication set to TRUE. In another example, for collision avoidance, a third party STA may send an LL indication frame when the following conditions are met: the third party STA receives both a soliciting frame in PPDU1 (soliciting PPDU) where the PHY header of the PPDU1 carrying the indication 1 set to FALSE and the indication 2 set to TRUE and a responding frame in PPDU2 (responding PPDU) where the PHY header of the PPDU2 carrying the indication 1 set to TRUE and the indication 2 set to FALSE. For example, if the acknowledgement policy indicator of the A-MPDU in the PPDU indicates "Implicit BAR" or "HETP Ack", the PPDU solicits an immediate acknowledgement frame from the recipient of the PPDU. The PHY header of the PPDU1 (soliciting PPDU) can include the indication 1 set to FALSE and the indication 2 set to TRUE. In this case, a PPDU2 (responding PPDU) carrying a BA frame can include the indication 1 set to TRUE. Consequently, the STA receiving PPDU1, PPDU2 with the indication 1 set to TRUE can transmit an LL indication frame without any collision (e.g., no hidden node among the third party STA, the TXOP holder and the TXOP responder).

In some embodiments, when a PPDU from a STA has indication 1 set to FALSE and indication 2 set to TRUE (i.e., indicating the allowance of AP's transmitting the responding PPDU with indication 1 set to TRUE) and an AP intends to transmit its buffered frames or a trigger frame related to LL frames, the AP can transmit the PPDU with the indication 1 set to FALSE to disallow third party STA's transmission of LL buffered frame indication. In this case, the AP can transmit its LL frames to avoid the collision with a third party STA's LL buffered frame indication.

In some embodiments, to avoid collision, a third party STA's LL buffered frame indication is transmitted through AP's explicit polling. A trigger frame is designed to explicitly indicate the polling of the LL buffered frame indication. In one embodiment, a specific Association ID (AID) 12 value in a User Info field indicates that the random access RUs defined by the User Info field are used for transmitting the LL buffered frame indication by the third-party STAs.

In some embodiments, to avoid collision, an AP also transmits the LL buffered frame indication while third party STAs transmit LL buffered frame indication, which allows the AP to announce its LL frame transmission if there is no LL buffered frame indication from the third party STAs. In such embodiments, when a PPDU from a STA has indication 1 set to FALSE and indication 2 set to TRUE (i.e., indicating the allowance of AP's transmitting the responding PPDU with indication 1 set to TRUE), the AP transmits the responding PPDU with the indication 1 set to TRUE.

Figure 8:
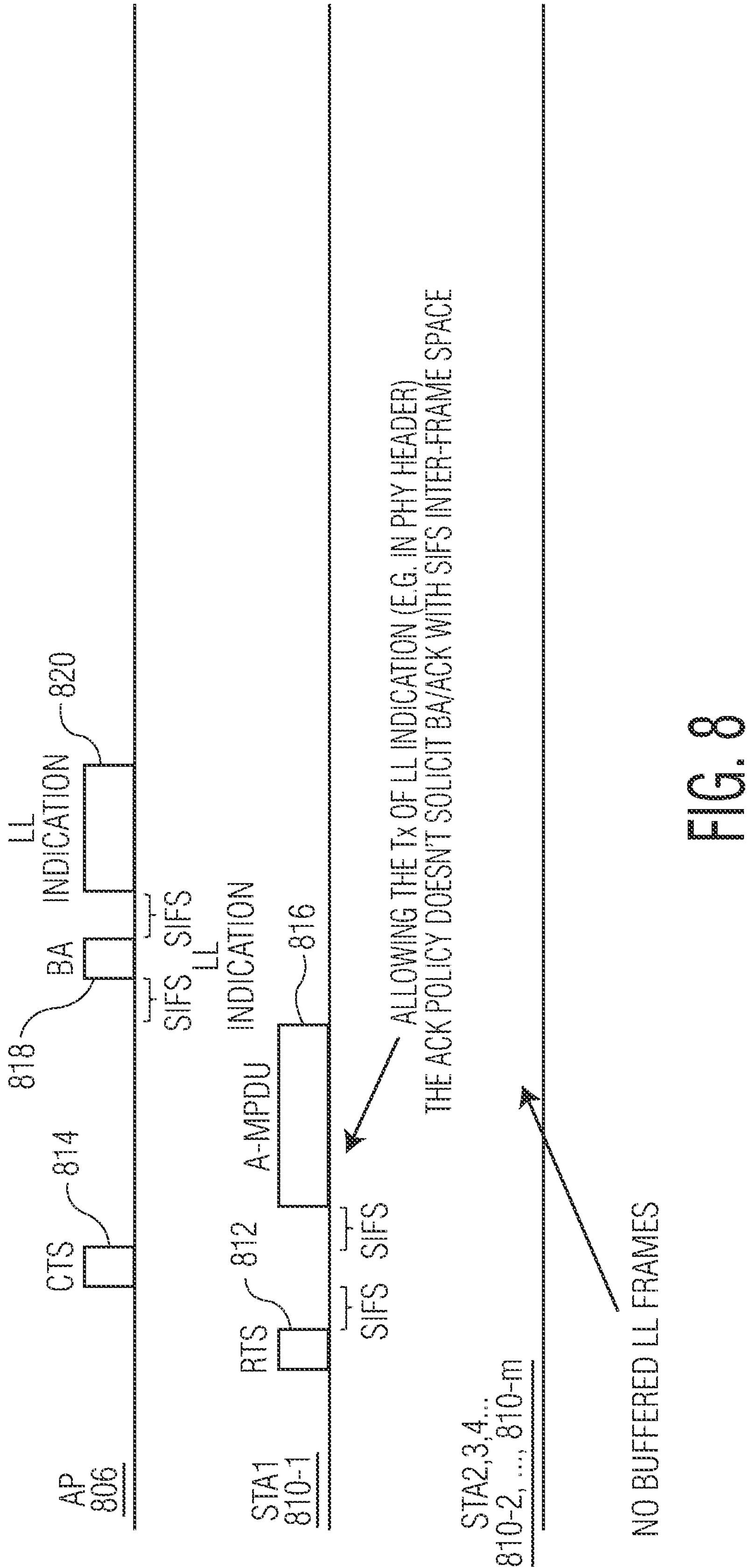
FIG. 8 depicts a frame exchange sequence diagram between an AP, a STA with a TXOP, and other STAs.

In some embodiments, when a PPDU from a STA (the TXOP holder) where the frames in the PPDU do not solicit responding frames has the indication 1 set to TRUE, an AP may transmit LL buffered frame indication if the AP intends to transmit LL buffered frames or a trigger frame for LL frame transmission. For example, the AP may transmit LL indication such that the AP can transmit its LL frames or a trigger frame for soliciting STA's LL frames or LL indication if the AP receives the PPDU with frames addressed to it that does not solicit the responding acknowledgement (ACK)/BA with SIFS inter-frame space. With this, since both a third-party STA and the AP transmit LL indication at the same time, the STA (TXOP holder) can decode the LL indication correctly. FIG. 8 depicts a frame exchange sequence diagram between an AP 806, a STA 810-1 with a TXOP, and other STAs 810-2, . . . , 810-*m*, where m is a positive integer that is greater than one. In the embodiment depicted in FIG. 8, the AP 806 may be implemented the same as or similar to the AP 106 depicted in FIG. 1, while the STAs 810-1, . . . , 810-*m* may be implemented the same as or similar to the STA 110-2, . . . , 110-*n* depicted in FIG. 1. In the frame exchange sequence diagram depicted in FIG. 8, a RTS 812 is sent by the STA 810-1 to reserve the TXOP. After an SIFS, a CTS 814 is sent by the AP 806. After an SIFS, an A-MPDU 816 is sent by the STA 810-1. After an SIFS, a BA frame 818 is sent by the AP 806. After an SIFS, a low latency (LL) buffered frame indication 820 is sent by the AP 806.

Figure 9:
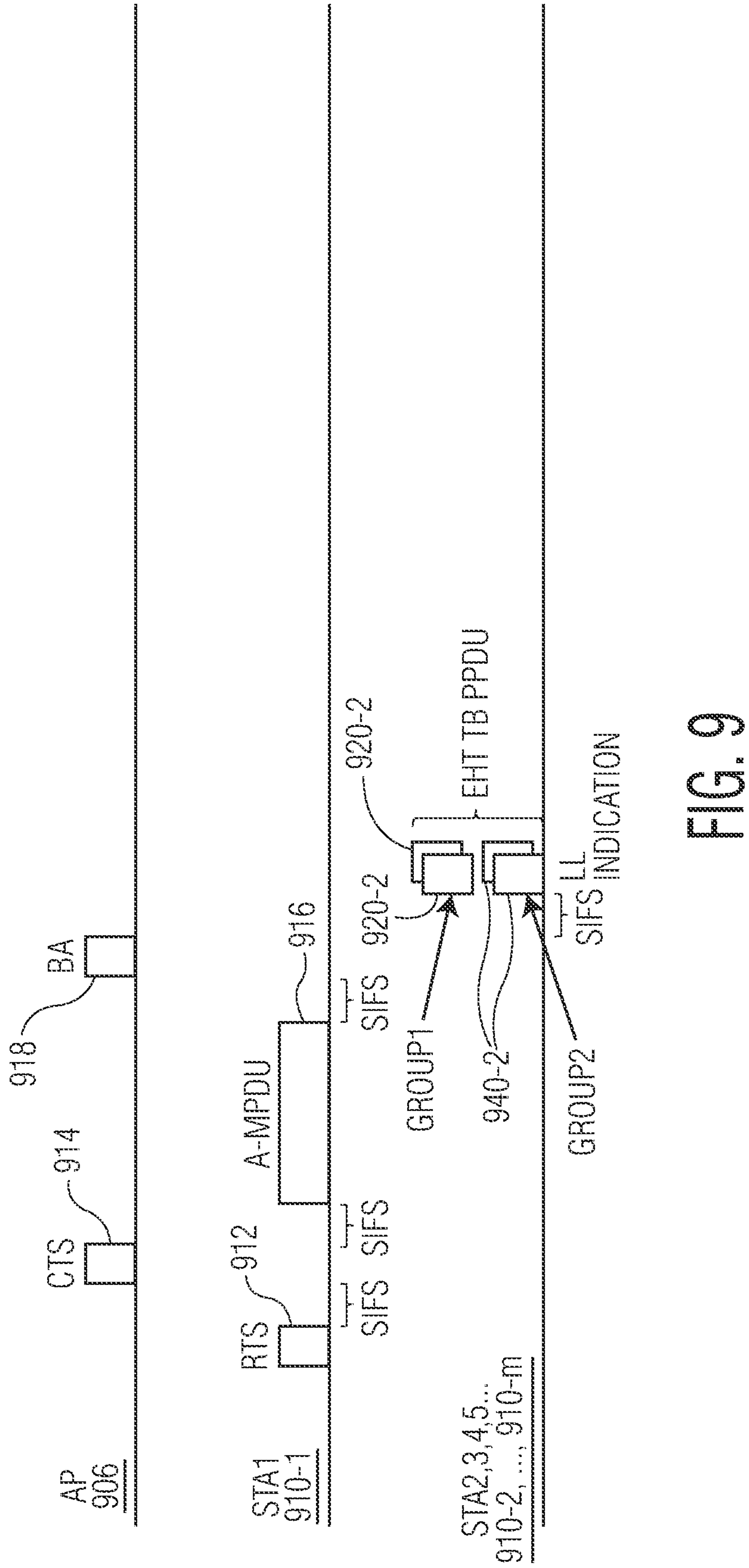
FIG. 9 depicts a frame exchange sequence diagram between an AP, a STA with a TXOP, and other STAs.

In some embodiments, group-based LL buffered frame indication is implemented. In these embodiments, an AP allocates STAs with TXOP preemption capability to different groups for LL buffered frame indication. For example, the STAs of different groups are allocated to different Resource Units (RUs) for LL buffered frame indication (LL Indication). The AP may notify each STA with LL frame transmitter (Tx) requirement the UL TB PPDU transmission parameters for transmitting the LL buffered frame indication. All the STAs in a group can use the same TB PPDU transmission parameters to transmit the LL indication in the same RU. When establishing the LL Indication reporting group with a STA, the AP can carry the UL TB PPDU transmission parameters for transmitting the LL Indication in the related Action frame. FIG. 9 depicts a frame exchange sequence diagram between an AP 906, a STA 910-1 with a TXOP, and other STAs 910-2, . . . , 910-*m*, where m is a positive integer that is greater than one. In the embodiment depicted in FIG. 9, the AP 906 may be implemented the same as or similar to the AP 106 depicted in FIG. 1, while the STAs 910-1, . . . , 910-*m* may be implemented the same as or similar to the STA 110-2, . . . , 110-*n* depicted in FIG. 1. In the frame exchange sequence diagram depicted in FIG. 9, an RTS 912 is sent by the STA 910-1 to reserve the TXOP. After an SIFS, a CTS 914 is sent by the AP 906. After an SIFS, an A-MPDU 916 is sent by the STA 910-1. After an SIFS, a BA frame 918 is sent by the AP 906. After an SIFS, low latency (LL) buffered frame indications 920-1, 920-2 are sent by a first group of STAs, while low latency (LL) buffered frame indications 940-1, 940-2 are sent by a second group of STAs.

In some embodiments, the same PPDU payload is used for LL buffered frame indication. In these embodiments, when multiple third party STAs transmit LL buffered frame indication, the PPDU payloads are the same. In an embodiment, the PPDU payloads have the same frame content. In a first option, the LL buffered frame indications are a CTS-to-Self with AP's BSSID (transmitted BSSID with Multiple BSSID feature) as the RA (e.g., receiver address). In a second option, the LL buffered frame indications are a single MPDU Delimiter with end-of-frame (EOF)=0 and Length=0. In a third option, the LL buffered frame indications are a NDP. In an embodiment, the transmission of the PPDU payloads uses the same Modulation Coding Scheme (MCS) or data rate, for example, MCS 0 or 6 Mbps. In an embodiment, the transmission of the PPDU payloads uses the same Number of Spatial Streams (Nss), e.g., 1 SS. In an embodiment, the transmission of the PPDU payloads uses the same scrambler initialization value, which may be announced by the AP. In a first option, the scrambler initialization values of different groups can have different values. Each group has one scrambler initialization value. In a second option, the scrambler initialization values of different groups can have same values.

Figure 10:
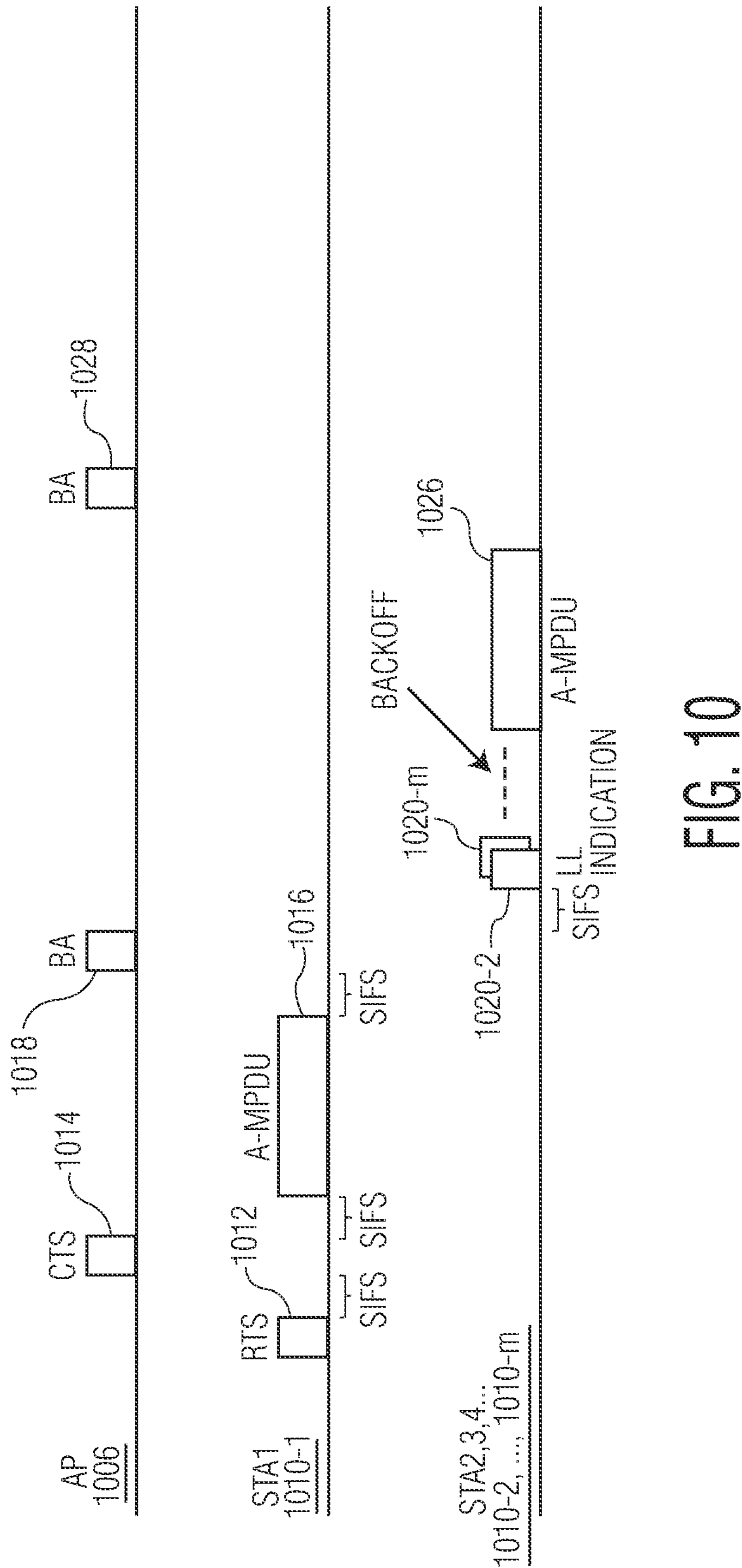
FIG. 10 depicts a frame exchange sequence diagram between an AP, a STA with a TXOP, and other STAs.

In some embodiments, LL frame transmission through backoff is implemented. In these embodiments, the TXOP holder stops its following frame transmission until the TXOP holder detects one PPDU with low latency traffic is transmitted. The STAs that transmit LL buffered frame indication transmit the LL frames after the backoff. The separate Enhanced Distributed Channel Access (EDCA) parameters can be used for the backoff. FIG. 10 depicts a frame exchange sequence diagram between an AP 1006, a STA 1010-1 with a TXOP, and other STAs 1010-2, . . . , 1010-*m*, where m is a positive integer that is greater than one. In the embodiment depicted in FIG. 10, the AP 1006 may be implemented the same as or similar to the AP 106 depicted in FIG. 1, while the STAs 1010-1, . . . , 1010-*m* may be implemented the same as or similar to the STA 110-2, . . . , 110-*n* depicted in FIG. 1. In the frame exchange sequence diagram depicted in FIG. 10, an RTS 1012 is sent by the STA 1010-1 to reserve the TXOP. After an SIFS, a CTS 1014 is sent by the AP 1006. After an SIFS, an A-MPDU 1016 is sent by the STA 1010-1. After an SIFS, a BA frame 1018 is sent by the AP 1006. After an SIFS, low latency (LL) buffered frame indications 1020-1, . . . , 1020-*m* are sent by the STAs 1010-2, . . . , 1010-*m*. After a backoff period, an A-MPDU 1026 is sent by one of the STAs 1010-2, . . . , 1010-*m*.

Figure 11:
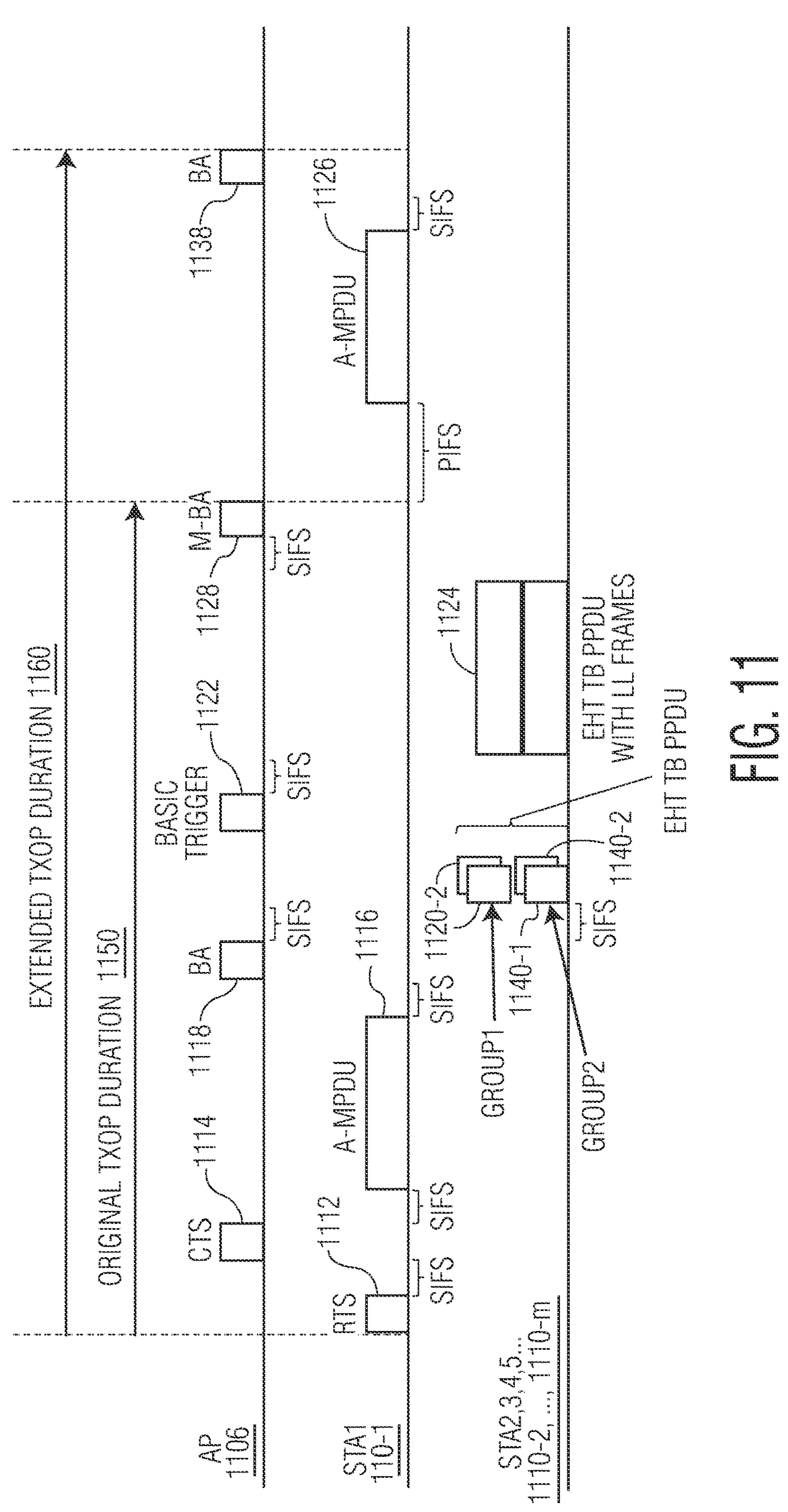
FIG. 11 depicts a frame exchange sequence diagram between an AP, a STA with a TXOP, and other STAs.

In some embodiments, LL frame transmission through triggering is implemented. In these embodiments, an AP solicits LL frames from the STAs of a group from which the LL buffered frame indication is received. In an embodiment, an AP uses the Basic Trigger to solicit the STAs of the group directly to transmit the LL frames. In an embodiment, an AP uses the Buffer Status Report Poll (BSRP) Trigger to solicit which STAs of the group have LL buffered frames, and then uses the Basic Trigger frame to solicit the STAs with LL buffered frames. In one embodiment, if the TXOP holder detects an inter-frame space (e.g., PIFS) that is larger than SIFS, the TXOP holder resumes its frame exchanges. In another embodiment, if the AP or third-party STA that transmits the low latency frames explicitly notify the TXOP holder to resume its frame exchanges. FIG. 11 depicts a frame exchange sequence diagram between an AP 1106, a STA 1110-1 with a TXOP, and other STAs 1110-2, . . . , 1110-*m*, where m is a positive integer that is greater than one. In the embodiment depicted in FIG. 11, the AP 1106 may be implemented the same as or similar to the AP 106 depicted in FIG. 1, while the STAs 1110-1, . . . , 1110-*m* may be implemented the same as or similar to the STA 110-2, . . . , 110-*n* depicted in FIG. 1. In the frame exchange sequence diagram depicted in FIG. 11, a RTS 1112 is sent by the STA 1110-1 to reserve the TXOP. After an SIFS, a CTS 1114 is sent by the AP 1106. After an SIFS, an A-MPDU 1116 is sent by the STA 1110-1. After an SIFS, a BA frame 1118 is sent by the AP 1106. After an SIFS, low latency (LL) buffered frame indications 1120-1, 1120-2 are sent by a first group of STAs, while low latency (LL) buffered frame indications 1140-1, 1140-2 are sent by a second group of STAs. Subsequently, a basic trigger frame 1122 is sent by the AP 1106. After an SIFS, an EHT TB PPDU with LL frames 1124 is sent by the STAs 1110-2, . . . , 1110-*m*. After an SIFS, a BA frame 1128 is sent by the AP 1106. After a PIFS, an A-MPDU 1126 is sent by the STA 1110-1. After an SIFS, a BA frame 1138 is sent by the AP 1106. In some embodiments, when a TXOP is preempted by low latency traffic for time T, the TXOP holder can extend its TXOP by T if the extension is allowed by regulation. For example, when the STA 1110-1 can extend its original TXOP duration 1150 to extended TXOP duration 1160.

Figure 12:
FIG. 12 depicts a frame exchange sequence diagram between an AP with a TXOP and STAs.
Figure 13:
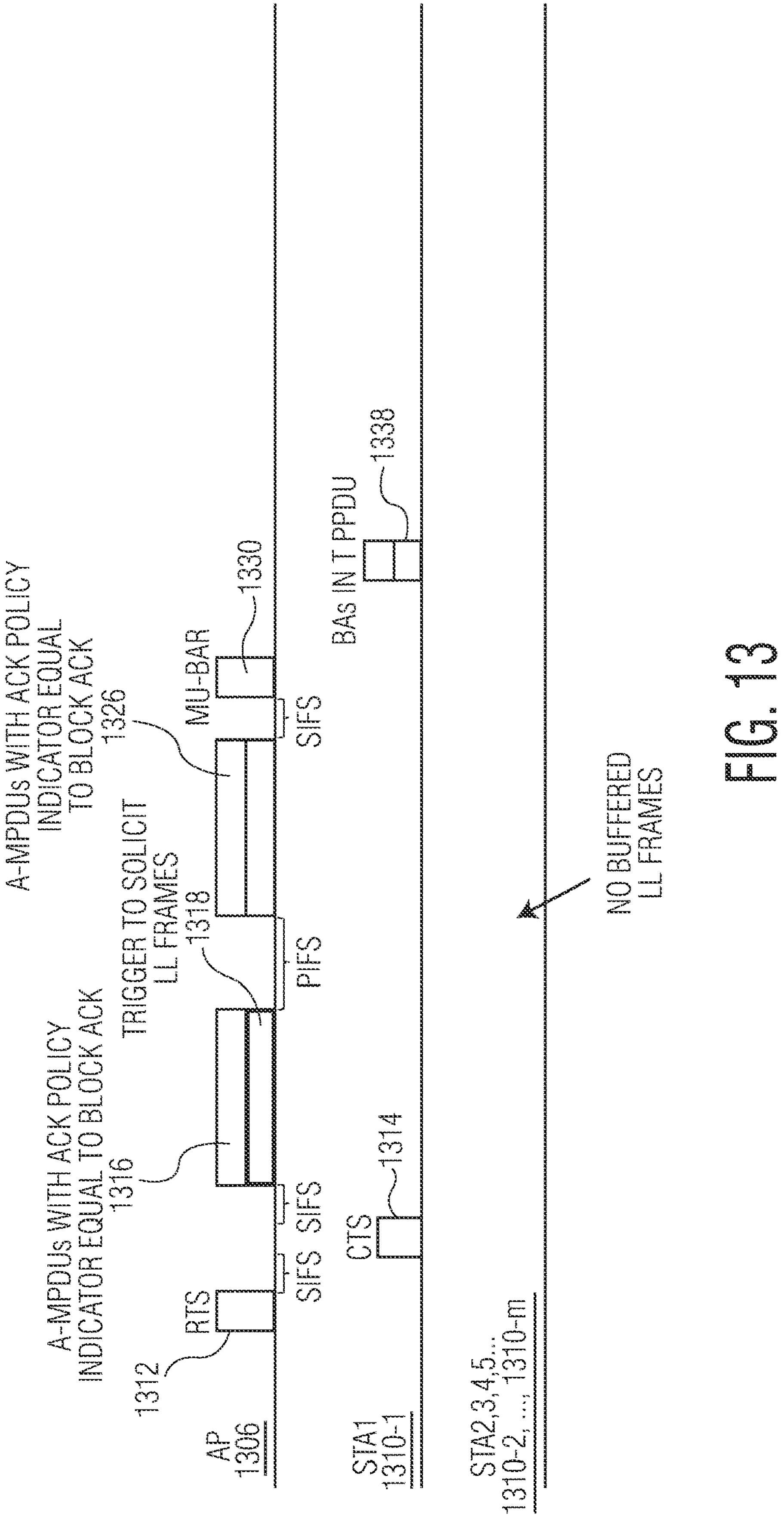
FIG. 13 depicts a frame exchange sequence diagram between an AP with a TXOP and STAs.

In some embodiments, the trigger of transmitting LL frame is ignored by the Scheduled STAs. In these embodiments, if a STA that is solicited by a Trigger frame for LL frame transmission has no buffered LL frames, the STA will not transmit usual latency (UL) frames. The TXOP holder can resume its transmission with an inter-frame space that is longer than SIFS when idle medium is detected. FIG. 12 depicts a frame exchange sequence diagram between an AP 1106 with a TXOP, and STAs 1110-1, . . . , 1110-*m*, where m is a positive integer that is greater than one. In the embodiment depicted in FIG. 12, the AP 1206 may be implemented the same as or similar to the AP 106 depicted in FIG. 1, while the STAs 1210-1, . . . , 1210-*m* may be implemented the same as or similar to the STA 110-2, . . . , 110-*n* depicted in FIG. 1. In the frame exchange sequence diagram depicted in FIG. 12, an RTS 1212 is sent by the AP 1206 to reserve the TXOP. After an SIFS, a CTS 1214 is sent by the STA 1210-1. After an SIFS, A-MPDUs with ACK policy indicator equal to block ACK 1216 and a trigger to solicit LL frames 1218 are sent by the AP 1206. After an SIFS, an EHT TB PPDU with LL frames 1224 is sent by the STAs 1210-2, . . . , 1210-*m*. FIG. 13 depicts a frame exchange sequence diagram between an AP 1306 with a TXOP, and STAs 1310-1, . . . , 1310-*m*, where m is a positive integer that is greater than one. In the embodiment depicted in FIG. 13, the AP 1306 may be implemented the same as or similar to the AP 106 depicted in FIG. 1, while the STAs 1310-1, . . . , 1310-*m* may be implemented the same as or similar to the STA 110-2, . . . , 110-*n* depicted in FIG. 1. In the frame exchange sequence diagram depicted in FIG. 13, an RTS 1312 is sent by the AP 1306 to reserve the TXOP. After an SIFS, a CTS 1314 is sent by the STA 1310-1. After an SIFS, A-MPDUs with ACK policy indicator equal to block ACK 1316 and a trigger to solicit LL frames 1318 are sent by the AP 1306. The STAs 1310-2, . . . , 1310-*m* do not have buffered LL frames to be transmitted. After a PIFS, A-MPDUs with ACK policy indicator equal to block ACK 1326 are sent by the AP 1306. After an SIFS, a multi-user block ACK request (MU-BAR) 1330 is sent by the AP 1306. Subsequently, BAs 1338 in T PPDU are sent by the STA 1310-1.

Figure 14:
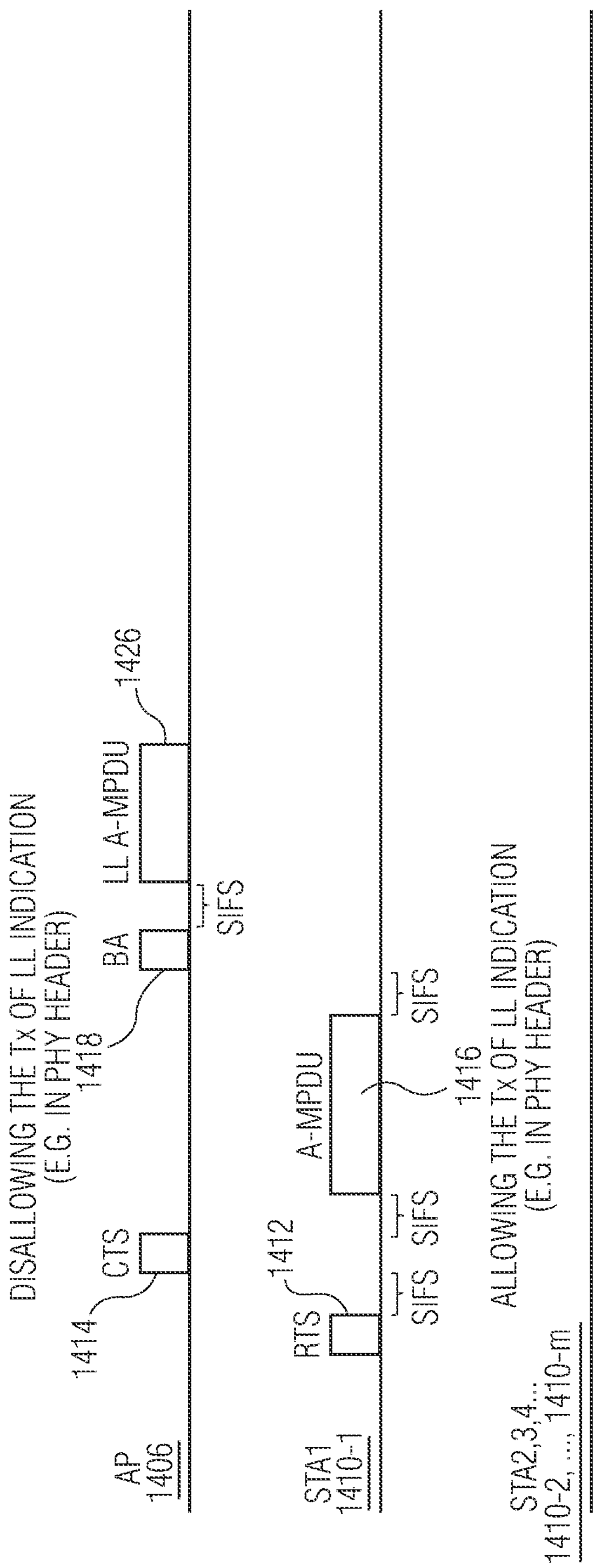
FIG. 14 depicts a frame exchange sequence diagram between an AP, a STA with a TXOP, and other STAs.

In some embodiments, an AP disallows LL indication transmission trigger by scheduled STAs. In these embodiments, an AP may disallow LL indication from third party STAs such that the AP can transmit LL frames. FIG. 14 depicts a frame exchange sequence diagram between an AP 1406, a STA 1410-1, and other STAs 1410-2, . . . , 1410-*m*, where m is a positive integer that is greater than one. In the embodiment depicted in FIG. 14, the AP 1406 may be implemented the same as or similar to the AP 106 depicted in FIG. 1, while the STAs 1410-1, . . . , 1410-*m* may be implemented the same as or similar to the STA 110-2, . . . , 110-*n* depicted in FIG. 1. In the frame exchange sequence diagram depicted in FIG. 14, an RTS 1412 is sent by the STA 1410-1 to reserve a TXOP. After an SIFS, a CTS 1414 is sent by the AP 1406. After an SIFS, an A-MPDU 1416 (in a PPDU with indication 1 set to FALSE and indication 2 set to TRUE in PHY header as an example) is sent by the STA 1410-1. After an SIFS, a BA frame 1418 (in a PPDU with indication 1 set to FALSE and indication 2 set to FALSE in PHY header as an example) is sent by the AP 1106, disallowing the transmission of LL indications. After an SIFS, an LL A-MPDU 1426 is sent by the AP 1406.

Figure 15:
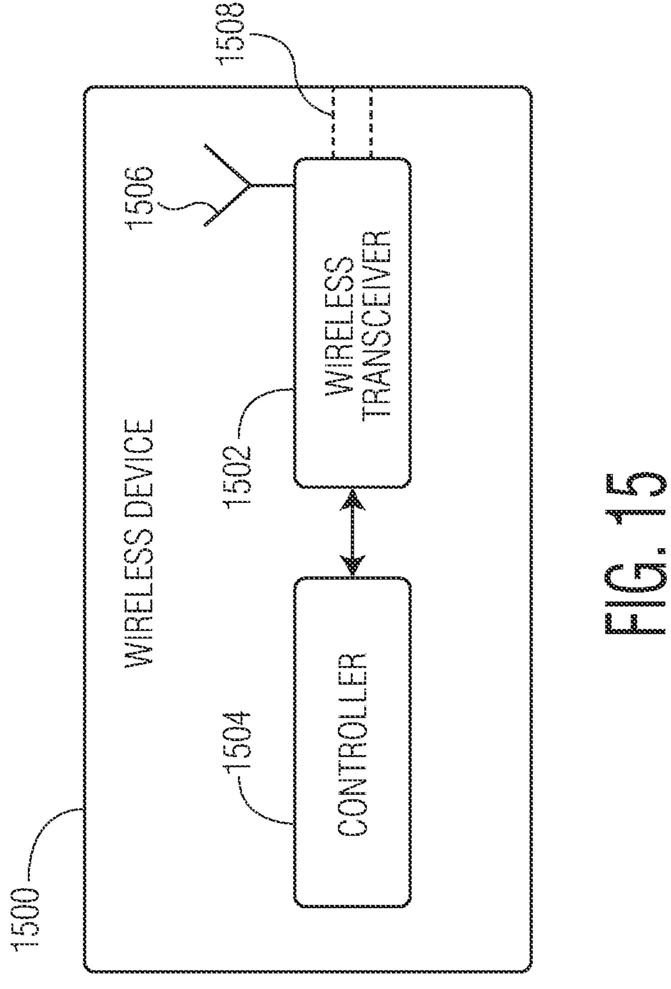
FIG. 15 depicts a wireless device in accordance with an embodiment of the invention.

FIG. 15 depicts a wireless device 1500 in accordance with an embodiment of the invention. The wireless device 1500 can be used in the wireless communications system 100 depicted in FIG. 1 and the multi-link communications system 200 depicted in FIG. 2. For example, the wireless device 1500 may be an embodiment of the AP 106 depicted in FIG. 1, the STA 110-1, . . . , **110-*n* depicted in FIG. 1, the APs 206-1, 206-2 depicted in FIG. 2, the stations STAs 210-1, 210-2 depicted in FIG. 2, the AP 306 depicted in FIG. 3, the stations STAs 310-1, . . . , 310-*m* depicted in FIG. 3, the AP 406 depicted in FIG. 4, the stations STAs 410-1, . . . , 410-*m* depicted in FIG. 4, the AP 506 depicted in FIG. 5, the stations STAs 510-1, . . . , 510-*m* depicted in FIG. 5, the AP 606 depicted in FIG. 6, the stations STAs 610-1, . . . , 610-*m* depicted in FIG. 6, the AP 706 depicted in FIG. 7, the stations STAs 710-1, . . . , 710-*m* depicted in FIG. 7, the AP 806 depicted in FIG. 8, the stations STAs 810-1, . . . , 810-*m* depicted in FIG. 8, the AP 906 depicted in FIG. 9, the stations STAs 910-1, . . . , 910-*m* depicted in FIG. 9, the AP 1006 depicted in FIG. 10, the stations STAs 1010-1, . . . , 1010-*m* depicted in FIG. 10, the AP 1106 depicted in FIG. 11, the stations STAs 1110-1, . . . , 1110-*m* depicted in FIG. 11, the AP 1206 depicted in FIG. 12, the stations STAs 1210-1, . . . , 1210-*m* depicted in FIG. 12, the AP 1306 depicted in FIG. 13, the stations STAs 1310-1, . . . , 1310-*m* depicted in FIG. 13, the AP 1406 depicted in FIG. 14, and/or the stations STAs 1410-1, . . . , 1410-*m* depicted in FIG. 14. However, the AP 106 depicted in FIG. 1, the STA 110-1, . . . , 110-*n* depicted in FIG. 1, the APs 206-1, 206-2 depicted in FIG. 2, the stations STAs 210-1, 210-2 depicted in FIG. 2, the AP 306 depicted in FIG. 3, the stations STAs 310-1, . . . , 310-*m* depicted in FIG. 3, the AP 406 depicted in FIG. 4, the stations STAs 410-1, . . . , 410-*m* depicted in FIG. 4, the AP 506 depicted in FIG. 5, the stations STAs 510-1, . . . , 510-*m* depicted in FIG. 5, the AP 606 depicted in FIG. 6, the stations STAs 610-1, . . . , 610-*m* depicted in FIG. 6, the AP 706 depicted in FIG. 7, the stations STAs 710-1, . . . , 710-*m* depicted in FIG. 7, the AP 806 depicted in FIG. 8, the stations STAs 810-1, . . . , 810-*m* depicted in FIG. 8, the AP 906 depicted in FIG. 9, the stations STAs 910-1, . . . , 910-*m* depicted in FIG. 9, the AP 1006 depicted in FIG. 10, the stations STAs 1010-1, . . . , 1010-*m* depicted in FIG. 10, the AP 1106 depicted in FIG. 11, the stations STAs 1110-1, . . . , 1110-*m* depicted in FIG. 11, the AP 1206 depicted in FIG. 12, the stations STAs 1210-1, . . . , 1210-*m* depicted in FIG. 12, the AP 1306 depicted in FIG. 13, the stations STAs 1310-1, . . . , 1310-*m* depicted in FIG. 13, the AP 1406 depicted in FIG. 14, and the stations STAs 1410-1, . . . , 1410-*m* depicted in FIG. 14 are not limited to the embodiment depicted in FIG. 15**.

In the embodiment depicted in FIG. 15, the wireless device 1500 includes a wireless transceiver 1502, a controller 1504 operably connected to the wireless transceiver, and at least one antenna 1506 operably connected to the wireless transceiver. In some embodiments, the wireless device 1500 may include at least one optional network port 1508 operably connected to the wireless transceiver. In some embodiments, the wireless transceiver includes a physical layer (PHY) device. The wireless transceiver may be any suitable type of wireless transceiver. For example, the wireless transceiver may be a LAN transceiver (e.g., a transceiver compatible with an IEEE 802.11 protocol). In some embodiments, the wireless device 1500 includes multiple transceivers. The controller may be configured to control the wireless transceiver to process packets received through the antenna and/or the network port and/or to generate outgoing packets to be transmitted through the antenna and/or the network port. In some embodiments, the controller is implemented within a processor, such as a microcontroller, a host processor, a host, a DSP, or a CPU. The antenna may be any suitable type of antenna. For example, the antenna may be an induction type antenna such as a loop antenna or any other suitable type of induction type antenna. However, the antenna is not limited to an induction type antenna. The network port may be any suitable type of port.

In accordance with an embodiment of the invention, the wireless transceiver 1502 is configured to communicate within a transmit opportunity (TXOP), where the wireless transceiver is further configured to receive a low latency (LL) buffered frame indication from a first wireless device with an inter frame space that is equal to a Short Interframe Space (SIFS), and the controller 1504 is configured to implement an inter frame space that is bigger than the SIFS between transmission of two consecutive frames through the wireless transceiver. In some embodiments, the wireless transceiver is further configured to transmit the two consecutive frames within the TXOP. In some embodiments, the wireless transceiver is further configured to receive the LL buffered frame indication from the first wireless device within the TXOP. In some embodiments, the two consecutive frames are not low latency frames. In some embodiments, the wireless transceiver is further configured to receive a low latency frame from the first wireless device. In some embodiments, the wireless transceiver is further configured to receive a low latency frame from a wireless access point (AP). In some embodiments, a maximal physical layer protocol data unit (PPDU) length in a Basic Service Set (BSS) is announced where stations in the BSS that support low latency preemption cannot transmit a PPDU that exceeds the announced maximal PPDU length. In some embodiments, the wireless transceiver is further configured to announce a maximal physical layer protocol data unit (PPDU) length in a Basic Service Set (BSS) where stations in the BSS that support low latency preemption cannot transmit a PPDU that exceeds the announced maximal PPDU length (e.g., the wireless device 1500 is a wireless AP). In some embodiments, a TXOP limit is announced, and where stations cannot have a TXOP duration that is longer than the announced TXOP limit. In some embodiments, the wireless transceiver is further configured to announce a TXOP limit, and stations cannot have a TXOP duration that is longer than the announced TXOP limit (e.g., the wireless device 1500 is a wireless AP). In some embodiments, a Clear to Send (CTS)-to-self with an address field being set to a Basic Service Set Identifier (BSSID) is used as the LL buffered frame indication. In some embodiments, the same Modulation Coding Scheme (MCS), Number of Spatial Streams (Nss), or scrambling initial value used to produce the CTS-to-self is used by multiple third party STAs to produce a physical layer protocol data unit (PPDU) that carries the LL buffered frame indication. In some embodiments, the wireless transceiver is further configured to receive LL buffered frame indications from stations, and where the stations are allocated to different groups such that each group is in a different resource unit (RU). In some embodiments, the wireless device is compatible with an Institute of Electrical and Electronics Engineers (IEEE) 802.11 protocol. In some embodiments, the wireless device is compatible with an Institute of Electrical and Electronics Engineers (IEEE) 802.11be protocol. In some embodiments, the wireless device is a component of a multi-link device (MLD). In some embodiments, the wireless device is a wireless access point (AP).

Figure 16:
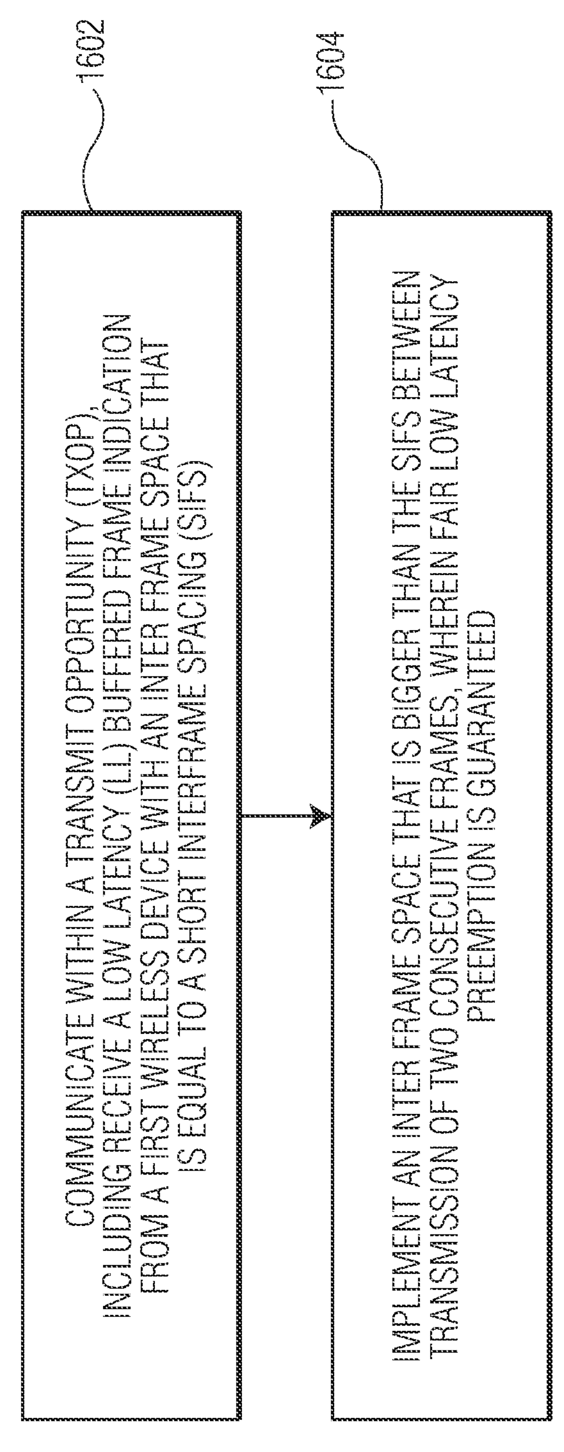
FIG. 16 is a process flow diagram of a method for wireless communications in accordance with an embodiment of the invention.

FIG. 16 is a process flow diagram of a method for wireless communications in accordance with an embodiment of the invention. At block 1602, it is communicated within a transmit opportunity (TXOP), including a low latency (LL) buffered frame indication is received from a first wireless device with an inter frame space that is equal to a Short Interframe Space (SIFS). At block 1604, an inter frame space that is bigger than the SIFS between transmission of two consecutive frames is implemented, where fair low latency preemption is guaranteed. In some embodiments, the two consecutive frames are transmitted within the TXOP. The wireless device and/or the first wireless device may be the same as or similar to the AP 106 depicted in FIG. 1, the STA 110-1, . . . , 110-*n* depicted in FIG. 1, the APs 206-1, 206-2 depicted in FIG. 2, the stations STAs 210-1, 210-2 depicted in FIG. 2, the AP 306 depicted in FIG. 3, the stations STAs 310-1, . . . , 310-*m* depicted in FIG. 3, the AP 406 depicted in FIG. 4, the stations STAs 410-1, . . . , 410-*m* depicted in FIG. 4, the AP 506 depicted in FIG. 5, the stations STAs 510-1, . . . , 510-*m* depicted in FIG. 5, the AP 606 depicted in FIG. 6, the stations STAs 610-1, . . . , 610-*m* depicted in FIG. 6, the AP 706 depicted in FIG. 7, the stations STAs 710-1, . . . , 710-*m* depicted in FIG. 7, the AP 806 depicted in FIG. 8, the stations STAs 810-1, . . . , 810-*m* depicted in FIG. 8, the AP 906 depicted in FIG. 9, the stations STAs 910-1, . . . , 910-*m* depicted in FIG. 9, the AP 1006 depicted in FIG. 10, the stations STAs 1010-1, . . . , 1010-*m* depicted in FIG. 10, the AP 1106 depicted in FIG. 11, the stations STAs 1110-1, . . . , 1110-*m* depicted in FIG. 11, the AP 1206 depicted in FIG. 12, the stations STAs 1210-1, . . . , 1210-*m* depicted in FIG. 12, the AP 1306 depicted in FIG. 13, the stations STAs 1310-1, . . . , 1310-*m* depicted in FIG. 13, the AP 1406 depicted in FIG. 14, the stations STAs 1410-1, . . . , 1410-*m* depicted in FIG. 14, and/or the wireless device 1500 depicted in FIG. 15.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A first wireless device comprising:

a wireless transceiver; and a controller configured to communicate within a transmit opportunity (TXOP) as a TXOP holder, wherein the controller is configured to:

receive a low latency (LL) buffered frame indication from a second wireless device at a first inter frame space, wherein the first wireless device supports low latency preemption; and determine that the LL buffered frame indication from the second wireless device is not received at the first inter frame space and, in response, transmit a physical layer protocol data unit (PPDU) with a second inter frame space that is greater than the first inter frame space;

wherein the LL buffered frame indication from the second wireless device is a Clear to Send (CTS)-to-self with an address field being set to a Basic Service Set Identifier (BSSID).

2. The first wireless device of claim 1, wherein the controller is further configured to transmit a soliciting PPDU to solicit the LL buffered frame indication, and wherein the first inter frame space follows the soliciting PPDU.

3. The first wireless device of claim 2, wherein the PPDU does not include a LL buffered frame.

4. The first wireless device of claim 1, wherein the controller is further configured to receive the LL buffered frame indication from the second wireless device within the TXOP.

5. The first wireless device of claim 1, wherein the controller is further configured to receive a low latency frame from the second wireless device.

6. The first wireless device of claim 1, wherein the controller is further configured to receive a low latency frame from a wireless access point (AP).

7. The first wireless device of claim 1, wherein the first and second wireless device are included in a Basic Service Set (BSS);

wherein the BSS includes an additional set of wireless devices;

wherein the controller is configured to announce a maximal PPDU length in the BSS; and wherein the wireless devices in the BSS that support low latency preemption cannot transmit a PPDU that exceeds the maximal PPDU length.

8. The first wireless device of claim 1, wherein a TXOP limit is announced, and wherein the second wireless device cannot have a TXOP duration that is longer than the announced TXOP limit.

9. The first wireless device of claim 1, wherein the controller is further configured to announce a TXOP limit, and wherein the second wireless device cannot have a TXOP duration that is longer than the announced TXOP limit.

10. The first wireless device of claim 1, wherein the controller is further configured to receive a plurality of LL buffered frame indications, each of the plurality of LL buffered frame indications carried in a separate PPDU generated using a common Modulation Coding Scheme (MCS), Number of Spatial Streams (Nss), or scrambling initial value.

11. The first wireless device of claim 1, wherein the controller is further configured to receive a plurality of LL buffered frame indications from a plurality of stations, and wherein the stations are allocated to different groups such that each group is in a different resource unit (RU).

12. The first wireless device of claim 1, wherein the first wireless device is compatible with an Institute of Electrical and Electronics Engineers (IEEE) 802.11 protocol.

13. The first wireless device of claim 1, wherein the first wireless device is compatible with an Institute of Electrical and Electronics Engineers (IEEE) 802.11be protocol.

14. The first wireless device of claim 1, wherein the first wireless device is a component of a multi-link device (MLD).

15. The first wireless device of claim 1, wherein the first wireless device is a wireless access point (AP).

16. The first wireless device of claim 1, wherein the first inter frame space is a Short Interframe Space (SIFS).

17. A method for wireless communications, the method comprising:

communicating within a transmit opportunity (TXOP) by a first wireless device, including receiving a low latency (LL) buffered frame indication from a second wireless device after an inter frame space that is equal to a Short Interframe Space (SIFS), wherein the first wireless device and the second wireless device support low latency preemption;

soliciting, by the first wireless device, the LL buffered frame from the second wireless device; and in response to not receiving the LL buffered frame, transmitting a physical layer protocol data unit (PPDU) using a second inter frame space that is greater than SIFS;

wherein the LL buffered frame indication from the second wireless device is a Clear to Send (CTS)-to-self with an address field being set to a Basic Service Set Identifier (BSSID).

18. The method of claim 17, wherein communicating within the TXOP comprises transmitting two consecutive frames within the TXOP.

19. A first wireless device comprising:

a wireless transceiver; and a controller configured to communicate within a transmit opportunity (TXOP) as a TXOP holder, wherein the controller is configured to receive a low latency (LL) buffered frame indication from a second wireless device at a first inter frame space;

wherein the first and second wireless devices support low latency preemption;

wherein the controller is further configured to transmit, via the wireless receiver, a physical layer protocol data unit (PPDU) with a second inter frame space that is greater than the first inter frame space when the LL buffered frame is not received at the first inter frame space;

wherein the first and second wireless device are included in a Basic Service Set (BSS) that further includes an additional set of wireless devices;

wherein the controller is configured to announce a maximal PPDU length in the BSS; and wherein the wireless devices in the BSS that support low latency preemption cannot transmit a PPDU that exceeds the maximal PPDU length;

wherein the LL buffered frame indication from the second wireless device is a Clear to Send (CTS)-to-self with an address field being set to a Basic Service Set Identifier (BSSID).

* * * * *